(12) United States Patent
Kestle et al.

(10) Patent No.: US 7,484,954 B2
(45) Date of Patent: Feb. 3, 2009

(54) MOLDING-SYSTEM LOCKING MECHANISM

(75) Inventors: Martin Richard Kestle, Everett (CA); Pierre Glaesener, Bissen (LU)

(73) Assignee: Husky Injection Molding Systems Ltd., Bolton, ON (CA)

( * ) Notice: Subject to any disclaimer, the term of this patent is extended or adjusted under 35 U.S.C. 154(b) by 80 days.

(21) Appl. No.: 11/451,928

(22) Filed: Jun. 13, 2006

(65) Prior Publication Data

US 2007/0296119 A1 Dec. 27, 2007

(51) Int. Cl.
*B29C 45/64* (2006.01)
(52) U.S. Cl. ............... 425/595; 425/589; 425/451.9
(58) Field of Classification Search ............ 425/150, 425/589, 595, 450.1, 451.7, 451.9, DIG. 221, 425/190; 264/328.1
See application file for complete search history.

(56) References Cited

U.S. PATENT DOCUMENTS

| | | | | |
|---|---|---|---|---|
| 2,244,123 A * | 6/1941 | Sebek | ............ | 164/343 |
| 5,035,606 A * | 7/1991 | Zakich | ............ | 425/569 |
| 5,378,141 A * | 1/1995 | Aoki | ............ | 425/589 |
| 5,417,913 A * | 5/1995 | Arend | ............ | 264/328.1 |
| 5,753,153 A | 5/1998 | Choi | | |
| 5,773,050 A | 6/1998 | Wohlrab | | |
| 5,879,726 A * | 3/1999 | Hsing | ............ | 425/451.2 |
| 5,922,372 A | 7/1999 | Schad | | |
| 6,089,852 A * | 7/2000 | Lee et al. | ............ | 425/338 |
| 6,093,361 A * | 7/2000 | Schad | ............ | 264/328.1 |
| 6,106,265 A * | 8/2000 | Von Holdt | ............ | 425/151 |
| 6,120,722 A * | 9/2000 | Schad | ............ | 264/328.1 |
| 6,179,606 B1 * | 1/2001 | Muller | ............ | 425/556 |
| 6,186,770 B1 | 2/2001 | Ziv-Av | | |
| 6,200,123 B1 | 3/2001 | Mailliet et al. | | |
| 6,210,144 B1 | 4/2001 | Mailliet et al. | | |
| 6,250,905 B1 * | 6/2001 | Mailliet et al. | ............ | 425/150 |
| 6,439,875 B1 | 8/2002 | Morita et al. | | |
| 6,719,553 B1 | 4/2004 | Hehl | | |
| 6,821,463 B2 * | 11/2004 | Di Dio et al. | ............ | 264/40.5 |
| 6,884,057 B2 | 4/2005 | Dantlgraber | | |
| 6,971,237 B2 | 12/2005 | Geiger | | |
| 6,984,121 B2 | 1/2006 | Fischbach et al. | | |
| 6,986,657 B2 * | 1/2006 | Kappelmuller et al. | ...... | 425/590 |
| 2005/0170037 A1 | 8/2005 | Koike et al. | | |

FOREIGN PATENT DOCUMENTS

| | | | |
|---|---|---|---|
| CA | 2047607 C | | 1/1992 |
| JP | 02252518 A | * | 10/1990 |

* cited by examiner

*Primary Examiner*—Philip C Tucker
*Assistant Examiner*—Dimple N Bodawala

(57) ABSTRACT

Discloses is: (i) a molding-system lock, (ii) a molding system having a molding-system lock, and/or (iii) a method of a molding-system lock, amongst other things.

14 Claims, 18 Drawing Sheets

MOLDING-SYSTEM LOCKING MECHANISM

TECHNICAL FIELD

The present invention generally relates to, but is not limited to, molding systems, and more specifically the present invention relates to, but is not limited to, (i) a molding-system lock, (ii) a molding system having a molding-system lock, and/or (iii) a method of a molding-system lock, amongst other things.

BACKGROUND

U.S. Pat. No. 5,753,153 (Inventor: Choi; Published: 1998 May 19) discloses a control system for clamp-up and mold-break operations of a tie-bar clamping mechanism. The control system can determine and adjust a starting position of a securing/clamping mechanism and a movable mold after each molding operation to achieve greater accuracy.

U.S. Pat. No. 5,773,050 (Inventor: Wohlrab; Published: 1998 Jun. 30) discloses a tool-closure system for an injection-molding machine that uses a threaded spindle to open and close tools, and piston and cylinder units for applying a high-pressure clamping force.

U.S. Pat. No. 5,922,372 (Inventor: Schad; Published: 1999 Jul. 13) discloses a molding-machine platen clamping system that includes columns fixed to a moving platen with teeth at remote end engaged by a hydraulic clamping system (this U.S. patent was reissued on 3 Sep. 2002 as patent U.S. Pat. No. RE 37,827).

U.S. Pat. No. 6,186,770 (Inventor: Ziv-Av; Published: 2001 Feb. 13) discloses a clamping assembly for an injection-molding machine that includes a pair of tie bars with threads which engage with threaded bushings in platens by relative rotation of the tie bar and the platens generated by an actuation system.

U.S. Pat. No. 6,200,123 (Inventor: Mailliet et al; Published: 2001 Mar. 13) discloses a hydraulic-closure unit, in e.g. a pressure injection-molding machine that combines double-acting annular cylinder with breech-action locking which allows relative sliding of a pressure rod and turns to engage inner and outer threads, taking up play and arriving at a force transmission position.

U.S. Pat. No. 6,210,144 (Inventor: Mailliet et al; Published: 2001 Apr. 3) discloses a closure unit for a pressure injection-molding machines, in compact arrangement which also allows free sliding of a moving platen. The closure unit includes double-acting hydraulic cylinders on a fixed platen which act through locking bushes onto tie rods with interrupted threads which are engaged whilst taking up backlash by turning.

U.S. Pat. No. 6,250,905 (Inventor: Mailliet et al; Published: 2001 Jun. 26) discloses a compact injection-molding machine closure unit that has locking bushes on tie bars between fixed and moving platens which engage with threads on bars to absorb backlash and to transmit a closure force from double-acting hydraulic cylinders.

U.S. Pat. No. 6,439,875 (Inventor: Morita et al; Published: 2002 Aug. 27) discloses a clamping apparatus for an injection-molding machine that includes a mechanical ram and a piston between which a chamber is defined for pressure exertion so as to drive the mechanical ram to obtain a mold-locking force.

U.S. Pat. No. 6,719,553 (Inventor: Hehl; Published: 2004 Apr. 13) discloses a slide-bar or C-frame pressure injection molding machine.

U.S. Pat. No. 6,821,463 (Inventor: Di Dio et al; Published: 2004 Nov. 23) discloses clamping of molds in an injection-molding press by supporting tie rods sliding with respect to platens, providing locking bushes for tie rods, a moving platen, and inter-engaging screw-threaded portions of the tie rods and the locking bushes.

U.S. Pat. No. 6,884,057 (Inventor: Dantlgraber; Published: 2005 Apr. 26) discloses an electromechanical tensioning unit that includes two tensioning jaws, a pushing-gear mechanism, and primary and secondary cylinders for moving the tensioning jaws.

U.S. Pat. No. 6,984,121 (Inventor: Fischbach et al; Published: 2006 Jan. 10) discloses a mold-clamping plate for an injection molding machine, that includes a central plate with sleeves at its corners which surround bores for spindles of a spindle drive, and the sleeves are only partially connected to plate.

U.S. Pat. No. 6,971,237 (Inventor: Geiger; Published: 2005 Dec. 6) discloses a servo-actuator for selectively controlling movement of an output member in two directions relative to a frame in a plastic-molding machine, that includes a motor-driven actuator with hydraulic force amplification.

United States Patent Application Number 2005/0170037 A1 (Inventor: Koike et al; Published: 2005 Aug. 4) discloses a die-clamping unit for an injection-molding machine that has a control device that: (i) drives a half-nut positioning servo-motor with the half-nut and a tie bar engaged with each other by an engaging mechanism and that (ii) controls a hydraulic-die clamping unit.

Prior art molding systems require a clamp piston to actively position interrupted teeth of a tie bar for locking and unlocking the tie bar to a platen, and this arrangement may require additional molding-system cycle time, increased cost and increased complexity of individual control valves for each clamp piston. If stroking of a clamp piston is used for positioning interrupted teeth for locking and unlocking a tie bar to a platen, a volume of hydraulic fluid in a clamp cylinder may be more than required for actual clamping stroke and therefore this arrangement may require more hydraulic fluid flow and energy to compress during a clamp-up phase.

It appears that most prior-art molding systems use at least three separate mechanisms, which are: (i) a lock for locking and unlocking a tie bar with a platen, (ii) a mold shut-height adjustment mechanism to adjust for a mold-shut height position when exchanging one mold for another mold, and/or (iii) a clamp piston that is stroked to accommodate the mold shut-height position within a range of a tooth pitch of interrupted teeth of the tie bar. Disadvantageously, by using each of the separate mechanisms in the prior-art molding systems, the following setbacks may be experienced: (i) increased cost, (ii) increased complexity, (iii) reduced reliability and/or (iv) increased cycle time of the molding system.

SUMMARY

According to a first aspect of the present invention, there is provided a molding-system lock, including a sleeve operatively accommodating locking and unlocking of a platen bar of a molding system, and operatively accommodating mold shut-height adjustment of the platen bar.

According to a second aspect of the present invention, there is provided a molding system, having a molding-system lock, including a sleeve operatively accommodating locking and unlocking of a platen bar, and operatively accommodating mold shut-height adjustment of the platen bar.

According to a third aspect of the present invention, there is provided a method of a molding system, including using a sleeve of a molding-system lock to operatively accommodate locking and unlocking of a platen bar, and using the sleeve of the molding-system lock to operatively accommodate mold shut-height adjustment of the platen bar.

A technical effect, amongst other technical effects, of the aspects of the present invention is that a molding-system lock includes structure that accommodates cost reduction and improved reliability of a molding system.

BRIEF DESCRIPTION OF THE DRAWINGS

A better understanding of the exemplary embodiments of the present invention (including alternatives and/or variations thereof) may be obtained with reference to the detailed description of the exemplary embodiments along with the following drawings, in which.

The drawings are not necessarily to scale and are sometimes illustrated by phantom lines, diagrammatic representations and fragmentary views. In certain instances, details that are not necessary for an understanding of the embodiments or that render other details difficult to perceive may have been omitted.

DETAILED DESCRIPTION OF THE EXEMPLARY EMBODIMENTS

Figure 1:
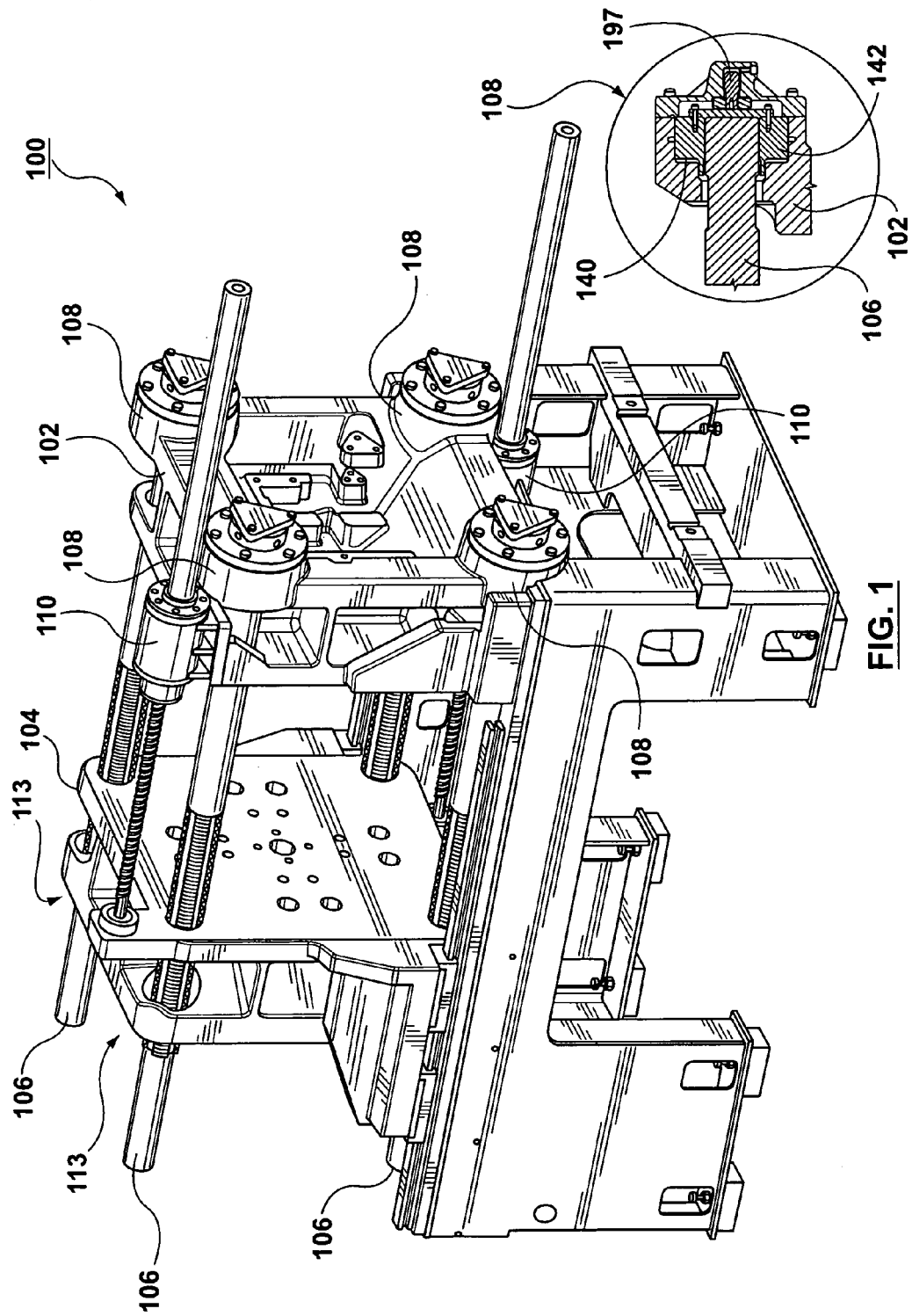
FIG. 1 is a perspective view of a molding system having a molding-system lock according to a first exemplary embodiment (which is the preferred embodiment)

FIG. 1 is a perspective view of a molding system 100 (hereafter referred to as "the system 100") having a molding-system lock 113 (hereafter referred to as "the lock 113") according to the first exemplary embodiment. The lock 113 may be also called a molding-system locking mechanism. To accommodate a general overview of the system 100, the lock 113 is not depicted in FIG. 1; however, the lock 113 is depicted (at least in part) and described beginning with reference to FIG. 2.

Figure 5:
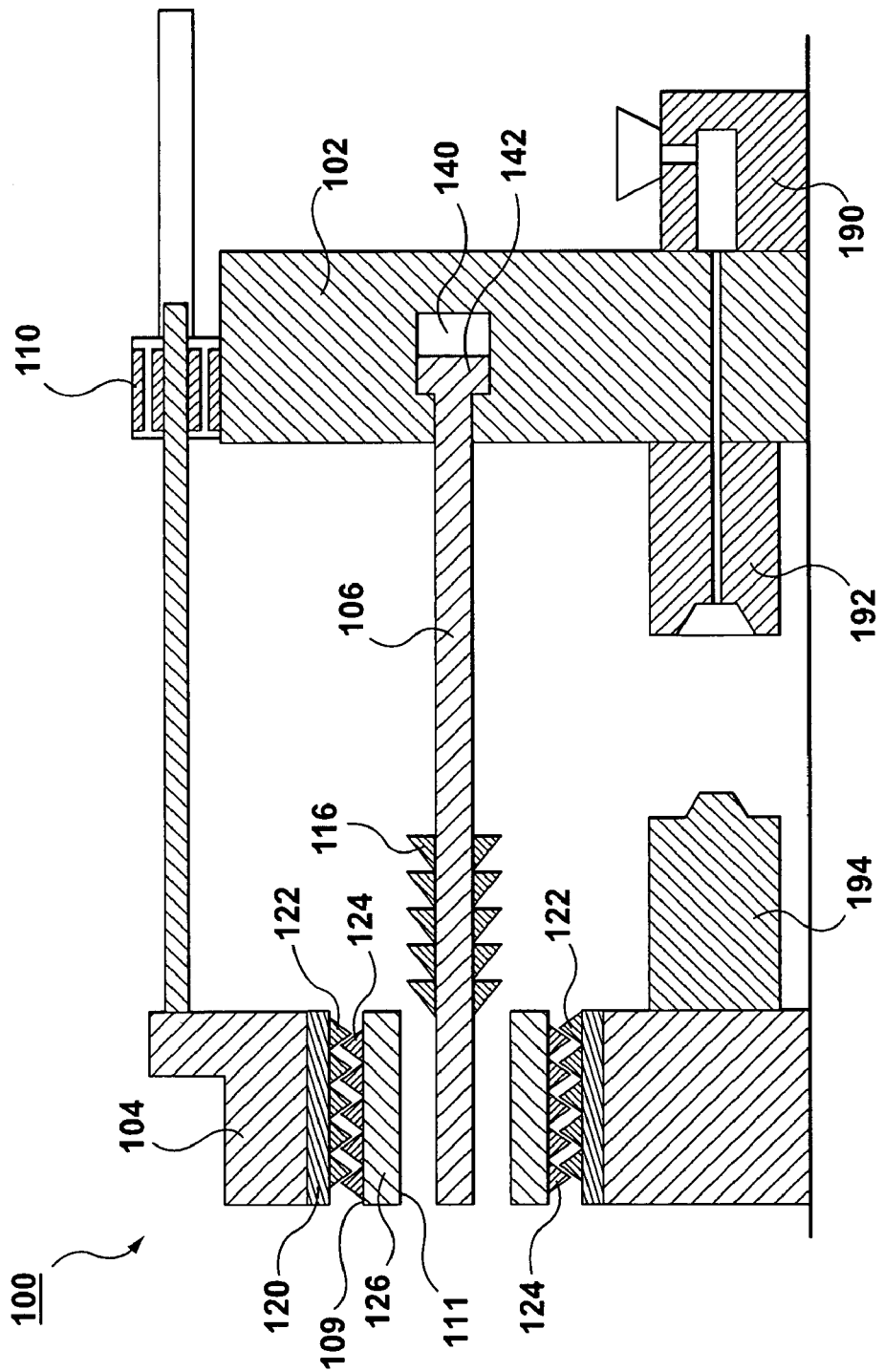
FIG. 5 is a cross-sectional view through a tie bar of the molding system of FIG. 4.

The system 100 is used to manufacture molded articles (not depicted) such as: (i) a completed article that requires no further processing, and/or (ii) a preform that requires further processing. Examples of the system 100 are: (i) the HyPET™ System, (ii) the Quadloc™ System, (iii) the Hylectric™ System, and (iv) the Magnesium-Molding System, all manufactured by Husky Injection Molding Systems Limited (Location: Bolton, Ontario, Canada; WWW-URL: www.husky.ca). The system 100 includes a stationary platen 102, and also includes a movable platen 104 that is movable relative to the stationary platen 102. The stationary platen 102 is adapted to have a mold portion mountable thereto, and the movable platen 104 is adapted to have another mold portion mountable thereto. The mold portions (which are also called "mold halves") form a mold. An injection unit (not depicted) is also included in the system 100. The mold portions and the injection unit are depicted in FIG. 5.

Tie bars 106 (generally the tie bars 106 are also referred to as the "platen bars") extend from the stationary platen 102 to the movable platen 104. Clamp assemblies 108 are located in the stationary platen 102, and they are used to actuatably apply a clamping force to the tie bars 106 so that the clamping force is transferable to the platens 102, 104 to hold the mold closed during injection of a molding material into the mold via the injection unit. The clamp assemblies 108 are threaded (that is, fixedly attached) onto the end of the tie bar 106. After the clamp assemblies 108 are de-actuated so as to remove the clamping force, a stroke actuator 110 is used to actuatably move the platen 104 away from the platen 102 so that the mold may be opened so as to allow extraction of a molded part from the mold. A mold-break actuator (not depicted) is used to actuatably apply a mold-break force to the mold portions. The stroke actuator 110 and the mold-break actuator may be combined into a single unit if required.

Each of the clamp assemblies 108 includes: (i) a clamp cylinder 140, and (ii) a clamp piston 142 positionable in the clamp cylinder 140. The clamp cylinder 140 is formed (or is housed) in the stationary platen 102. The clamp piston 142 is connected to a corresponding tie bar 106. The clamp piston 142 is placable in a hard stop position (that is, the clamp piston 142 is abuttable against the platen 102). An actuator 197 (piston, etc) is used to push the clamp piston 142 back into its hard stop position (the hard stop position of the clamp piston 142 is not depicted in FIG. 1 to provide an improved view of the clamp assemblies 108). The tie bars 106 and their respective clamp pistons 142 are movable axially toward the stationary platen 102 (that is, to the right of FIG. 1) once hydraulic fluid is introduced into the clamp cylinders. The tie bars 106 and respective clamp pistons are movable toward the movable platen 104 (to the left) by some other means such as hydraulic fluid, springs, etc.

Figure 2:
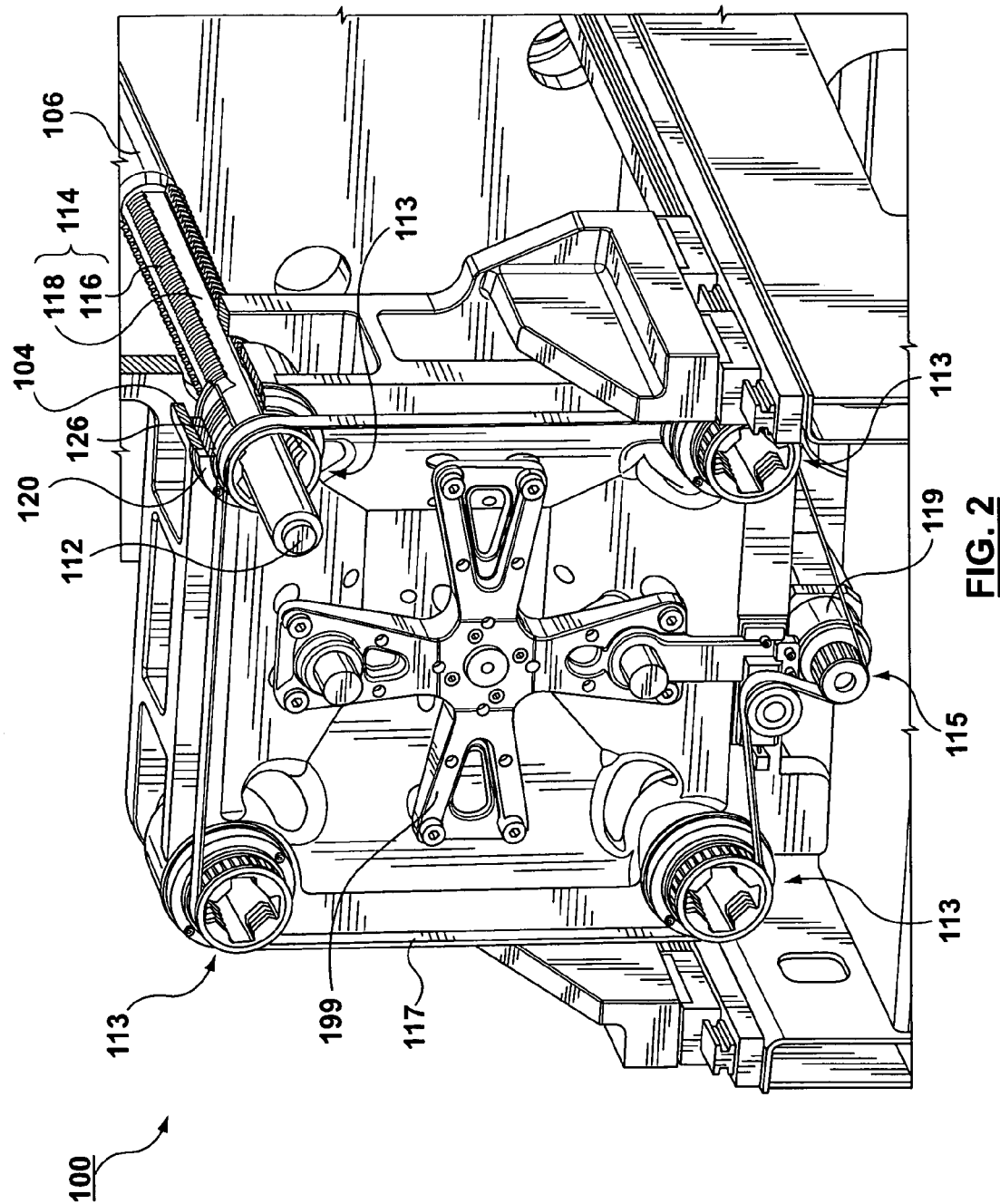
FIG. 2 is a perspective view of a movable platen of the molding system of FIG. 1.

FIG. 2 is a perspective view of the movable platen 104 of the system 100 of FIG. 1. In this view, only one tie bar 106 is depicted. Each of the tie bars 106 of FIG. 1 is constructed along a similar fashion to that of the tie bar 106 depicted in FIG. 2. A distal end 112 of tie bar 106 includes bar-interrupted teeth 114 (hereafter referred to as the "teeth 114") extending over a length of the tie bar 106. The bar-interrupted teeth 114 include: (i) at least one or more rows of tie-bar teeth 116 (hereafter referred to as the "teeth 116") extending from the tie bar 106, and (ii) at least one or more of the tie-bar slots 118 defined through the teeth 116 extending longitudinally along the tie bar 106. Preferably, the number of the teeth 116 and of the tie-bar slots 118 are four; however, any suitable number may be used.

Optionally, an ejector plate 199 is operatively couplable to the movable platen 104, and the ejector plate 199 is used, as known to those skilled in the art, to eject molded parts.

The look 113 (one per tie bar) is adapted to receive a respective tie bar 106. The lock 113 is used to selectively lockably engage and lockably disengage the tie bars 106 with the movable platen 104. The lock 113 includes a sleeve 126 that operatively accommodates locking and unlocking of a tie bar 106 relative to the platen 104. The sleeve 126 operatively accommodates mold shut-height adjustment of the tie bar 106. A lock-drive assembly 115 is used to synchronously lock and unlock the locks 113. Preferably, the lock-drive assembly 115 includes a toothed belt 117 (hereafter referred to as the "belt 117") that is drivable by an electric motor 119. According to an alternative (not depicted) of the lock-drive assembly 115, the lock-drive assembly 115 includes hydraulically-driven links that impart motion to the lock 113 so as to lock and unlock the tie bar 106 to the movable platen 104.

Figure 3:
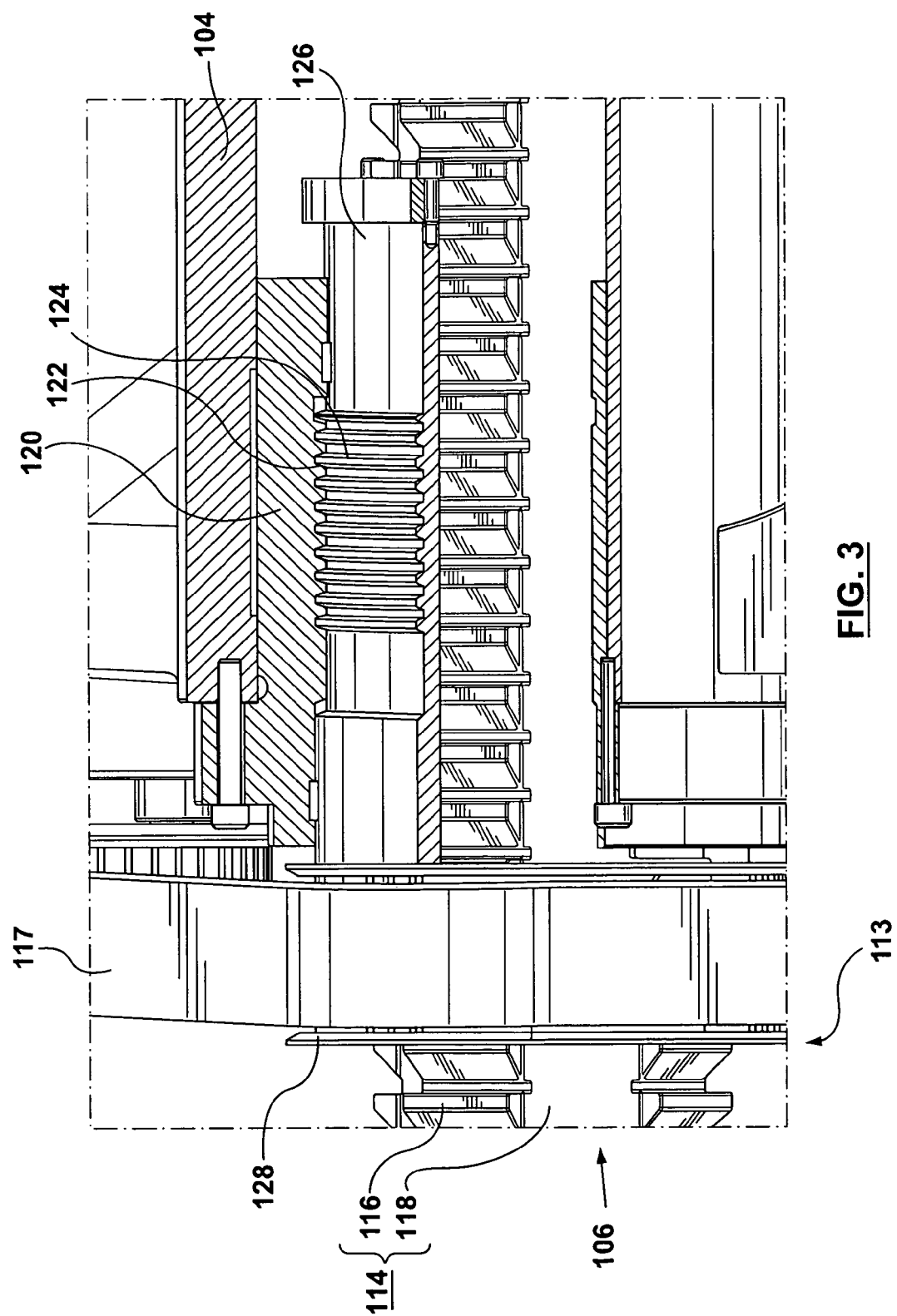
FIG. 3 is a partial sectional view of the molding system 100 of FIG. 1.

FIG. 3 is a partial sectional view of the movable platen 104 and the tie bar 106 born of the system 100 of FIG. 1. A fixed sleeve 120 is rigidly attachable to the movable platen 104 so that a clamping force may be transmitted to the movable platen 104 via the tie bar 106. The fixed sleeve 120 includes fixed-sleeve threads 122 (hereafter referred to as the "threads 122") extending toward the sleeve 126. The sleeve 126 is threadably engagable (preferably, rotatably engagable) with the fixed sleeve 120. According to a variant, the fixed sleeve 120 is not used and the sleeve 126 is threadably engagable with the platen 104. The purpose of the fixed sleeve 120 is to merely afford ease of manufacturing of the platen 104, and to permit the sleeve 126 to be threadably movable relative to the platen 104 (so that the sleeve 126 can operatively accommodate mold shut-height adjustment of the tie bar 106 and the platen 104).

The sleeve 126 includes externally-extending sleeve threads 124 (hereafter referred to as the "threads 124") that are engagable with the threads 122. The sleeve 126 includes a tie-bar facing surface (hidden in FIG. 3). The tie-bar facing surface of the sleeve 126 includes sleeve-interrupted teeth 129 (hereafter, from time to time, referred to as the "teeth 129" and depicted in FIG. 4) that are interlockable with the bar-interrupted teeth 114 of the tie bar 106. The sleeve-interrupted teeth 129 include sleeve teeth 130 and sleeve slot 132 (the sleeve slot 132 extend through the sleeve teeth 130) which are selectively engagable and disengagable with respective tie-bar slots 118 and tie-bar teeth 116 (this arrangement is more clearly shown in FIG. 4). A distal end of the sleeve 126 includes a pulley 128 that is drivable by the belt 117 (that is preferably toothed), and the belt 117 is drivable by the electric motor 119 (depicted in FIG. 2). Preferably, a sufficient length of the threads 124 and of the threads 122 are provided such that the sleeve 126 is rotationally positionable over a length that is greater than a pitch of the teeth 129 of the sleeve 126.

A sufficient axial-tooth clearance is provided in the sleeve-interrupted teeth 129 and the bar-interrupted teeth 114, such that when: (i) the sleeve 126 is rotated between a locked position and an unlocked position and (ii) the tie bar 106 is in a correct position relative to the sleeve 126, a small amount of axial movement between the threads 124 and the threads 122 does not result in contact between the sleeve 126 and the tie bar 106.

Figure 4:
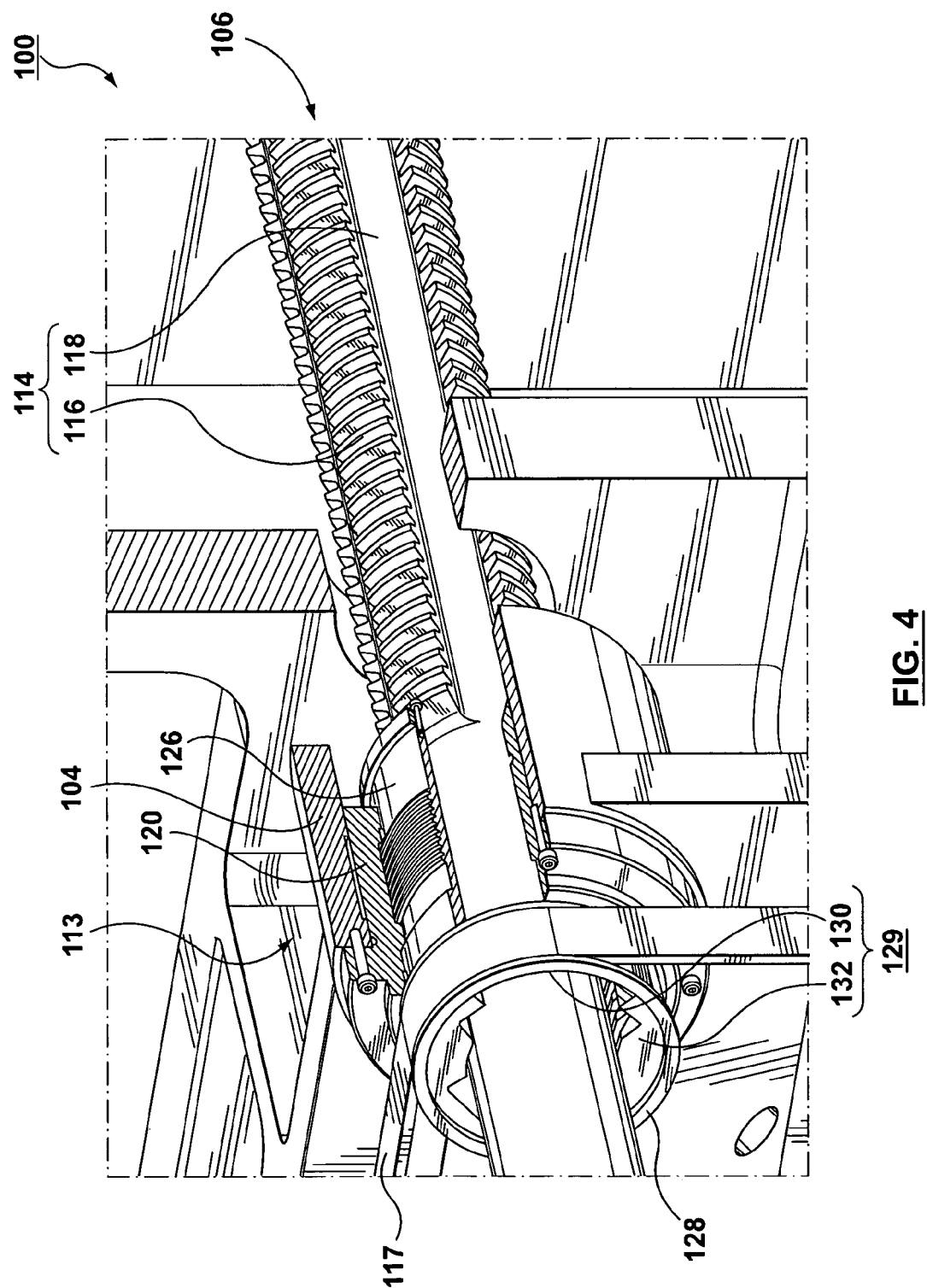
FIG. 4 is a perspective view of the molding-system lock of FIG. 1.

FIG. 4 is a perspective view of the lock 113 of the system 100 of FIG. 1, in which the lock 113 is depicted in an unlocked condition. The sleeve 126 is depicted in a position so that the teeth 129 are clear of the teeth 114 so as to allow the sleeve 126 to freely rotate without risk of the two sets of teeth 114, 129 of making contact. This is the sleeve-adjustment position or a lock-clearance position. A set of the sleeve teeth 130 and a set of the sleeve slots 132 are selectively engagable and disengagable with respective tie-bar slots 118 and tie-bar teeth 116. In the unlocked condition, the sleeve teeth 130 are aligned with the tie-bar slot 118, and the sleeve slot 132 are aligned with the tie-bar teeth 116. The movable platen 104 is depicted positioned such that the mold halves attached to the platens 102, 104 are separated (opened) from each other (this is a mold-open position). In the mold-open position, the movable platen 104 is positioned (usually) furthest away from the stationary platen 102.

FIG. 5 is a cross-sectional view through the tie bar 106 of the system 100 of FIG. 4. A mold includes a mold half 194 that is fixedly attached to the platen 104. The mold also includes a mold half 192 that is fixedly attached to the platen 102. In this view, only one tie bar 106 is depicted for simplifying the understanding of the first exemplary embodiment. The clamp assemblies 108 includes the clamp piston 142 and the clamp cylinder 140. In the mold-open position, the tie bar 106 and a clamp piston 142 are positioned to the left side of the stationary platen 102 (that is, they are fully retracted). The belt 117 (not depicted) will be used to rotate each of the sleeves 126 (that is, there is a sleeve 126 mounted to respective corners of the movable platen 104) into a position such that the sleeve teeth 130 may become lockably aligned (in a lock-registration position) with the tie-bar slots 118 after the platen 104 is stroked to close the mold half 192 and the mold half 194 shut; after the mold is closed and since the teeth 114, 129 are in lockable registration (lock-registration), the sleeve 126 may be further rotated (via the motor and belt 117) sufficiently enough so that the teeth 129 and the teeth 114 may become locked together (a condition depicted in FIG. 9). In FIG. 5, the teeth 114, 129 are depicted as being in a lock clearance position so that the platen 104 and the sleeve 126 may then be stroked so as to then close the mold half 192 and the mold half 194. The injection unit 190 is coupled to the platen 102 so as to inject a molding material into the mold half 192 and the mold half 194. The sleeve 126 has an outer surface 109 that threadably engages the fixed sleeve 120. The sleeve 126 includes an inner surface 111. The threads 124 extend from the outer surface 109 and so that the threads 124 may cooperate with the threads 122 that extend from the fixed sleeve 120.

The sleeve-interrupted teeth 129 are displaced or cleared from the bar-interrupted teeth 114, and this is a lock-clearance condition (that is, the teeth 114, 129 are rotated to clear from each other and then they are longitudinally spaced apart or longitudinally offset from each other so as to permit the sleeve 126 to be rotated by the belt 117 as many times as required). In the lock-clearance condition, the sleeve-interrupted teeth 129 and the bar-interrupted teeth 114 cannot become inter-locked if the sleeve 126 is rotated by the belt 117. Once the sleeve-interrupted teeth 129 are displaced from the bar-interrupted teeth 114, the sleeve 126 may be rotated (moved, placed or positioned) in a lockable-registration position relative to bar-interrupted teeth 114 (that is, lockable registration of the teeth 114, 129 means that the sleeve 126 is so positioned rotated or indexed by the belt 117 so that the teeth 114, 129 are lockable with each other after or once the sleeve-interrupted teeth 129 of the sleeve 126 are moved to overlap the bar-interrupted teeth 114). Placement of the sleeve-interrupted teeth 129 in the lockable-registration position takes into account mold replacement (that is, so that mold-shut height may be accommodated when the mold is closed).

To reach the lock-clearance condition, the sleeve-interrupted teeth 129 were previously moved away from a lockable-engagement condition with the bar-interrupted teeth 114 to the lock-clearance condition.

Figure 7:
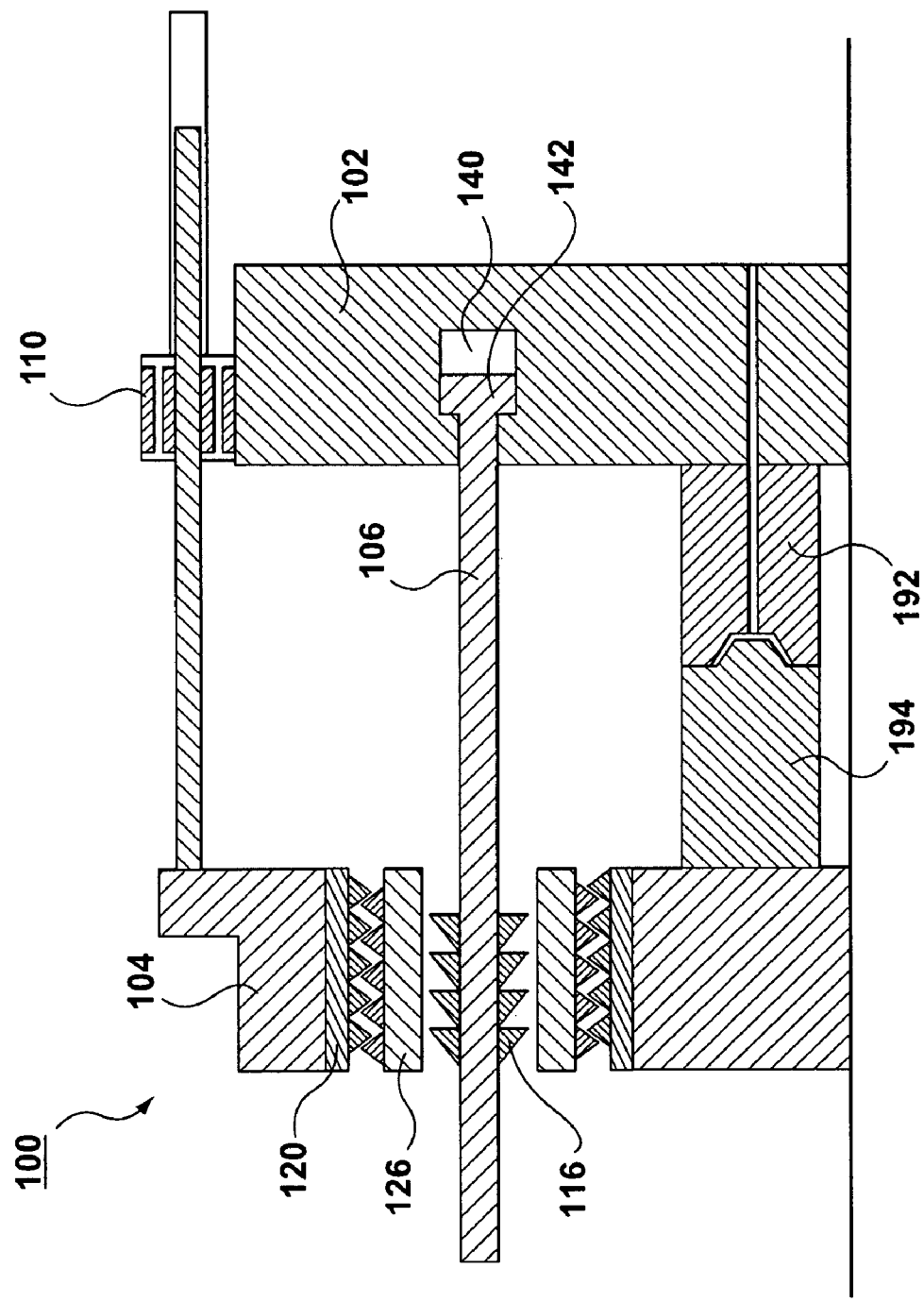
FIG. 7 is a cross-sectional view through a tie bar of the molding system 100 of FIG. 6.
Figure 9:
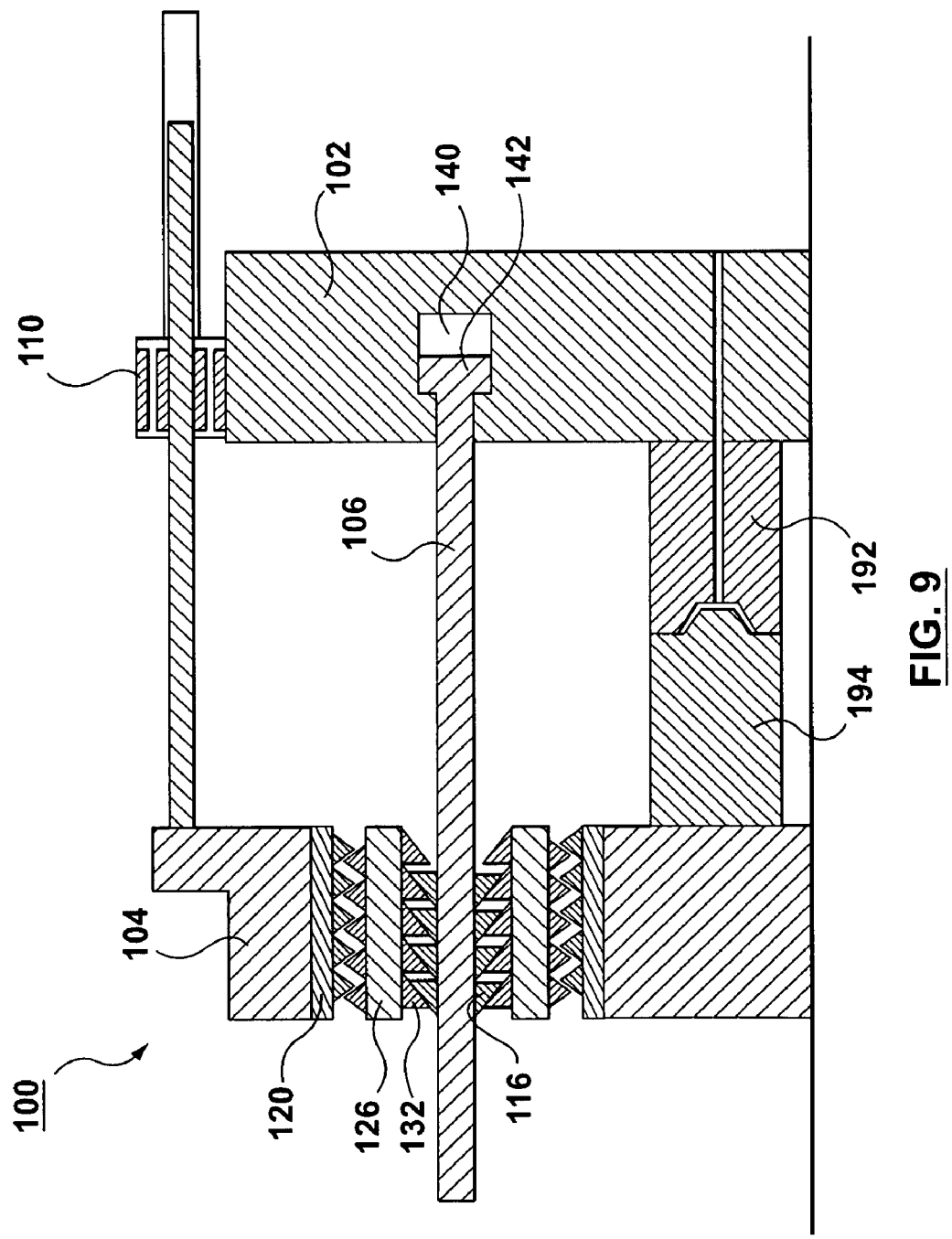
FIGS. 9, 10, 11, 12, 13, 14, and 15 are cross-sectional views through a tie bar of the molding system of FIG. 8.

After placement of the sleeve-interrupted teeth 129 (which takes into account mold replacement), the sleeve-interrupted teeth 129 will be moved from the lock-clearance condition to a lockable-engagement condition (the lockable-engagement condition is depicted in FIGS. 7 and 9) with the bar-interrupted teeth 114 so that upon mold closure, the sleeve-interrupted teeth 129 and the bar-interrupted teeth 114 are advantageously registered to be interlockable with each other.

A technical effect, amongst other technical effects, of the lock 113 is that since the lock 113 includes structure that: (i) controls mold shut-height adjustment, and (ii) locks and unlocks a tie bar to the platen 104, the advantages of: (i) cost reduction, and/or (ii) improved reliability of the system 100 may be realized. Another potential technical effect of the lock 113 is that a clamp piston stroke is reduced to a minimum (that is, the stroke may be performed so that only what is required for tooth clearance and for straining molding-system components under a clamp-up condition). Yet another potential technical effect of the lock 113 is that only one valve may be used to control all clamp pistons. Yet another potential technical effect of the lock 113 is that cycle time may be improved because active re-positioning of clamp pistons is not necessarily required for locking or unlocking of a tie bar, and a clamp piston is positionable with a hard stop at the end of its travel.

Figure 6:
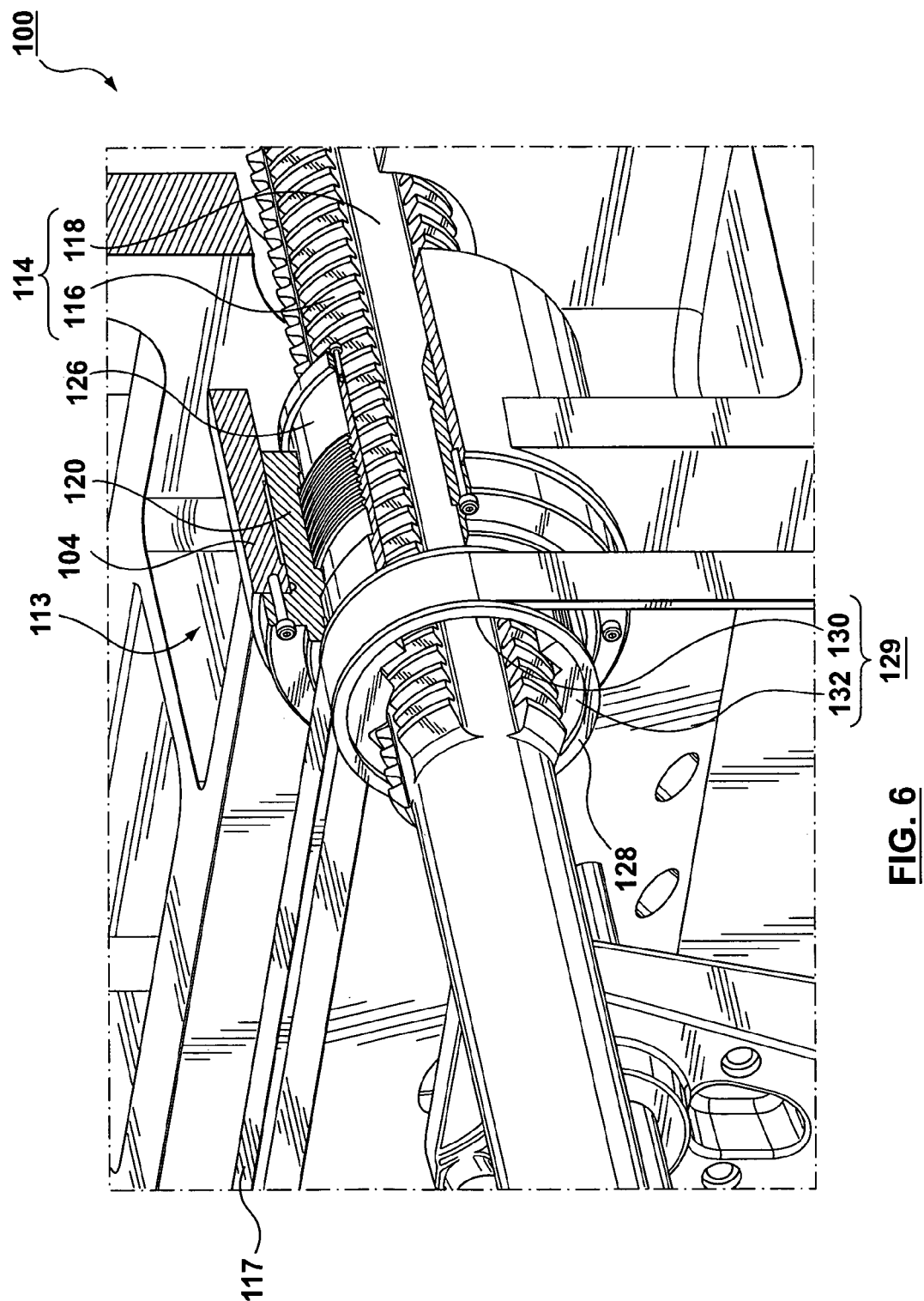
FIG. 6 is another perspective view of the lock of FIG. 1.

FIG. 6 is another perspective view of the lock 113 of the system 100 of FIG. 1, in which the lock 113 is depicted in the lockable engagement condition (but the teeth 114, 229 are unlocked from each other). The teeth 114, 129 may be referred to as "pineapple" structures. After mold installation, the movable platen 104 has been moved or stroked toward the stationary platen 102 (that is, toward the right side of FIG. 6) until the mold is closed (that is, the mold-closed position). The mold-closed position is sensed by a position sensor (not depicted) that is coupled to a control computer (not depicted), and the control computer records the sensed mold-closed position for future reference. After the mold-closed position has been recorded, the movable platen 104 is moved back to the left (that is, to the mold-open position) past the bar-interrupted teeth 114 of the tie bars 106 (as shown in FIG. 4). Each of the sleeves 126 are then rotated by the electric motor 119 and the belt 117 to a position where the sleeve teeth 130 (which are interrupted) and the teeth 116 (which are tie-bar interrupted) are clear of each other after the platen 104 is stroked to close the mold.

FIG. 7 is a cross-sectional view through the tie bar 106 of the system 100 of FIG. 6. In this view, only one tie bar 106 is depicted for simplifying the understanding of the first exemplary embodiment. The movable platen 104 is depicted stroked back to the mold-closed position, but the sleeve teeth 130 and the bar-interrupted teeth 114 are depicted disengaged with each other (that is: they are not yet engaged with each other).

Figure 8:
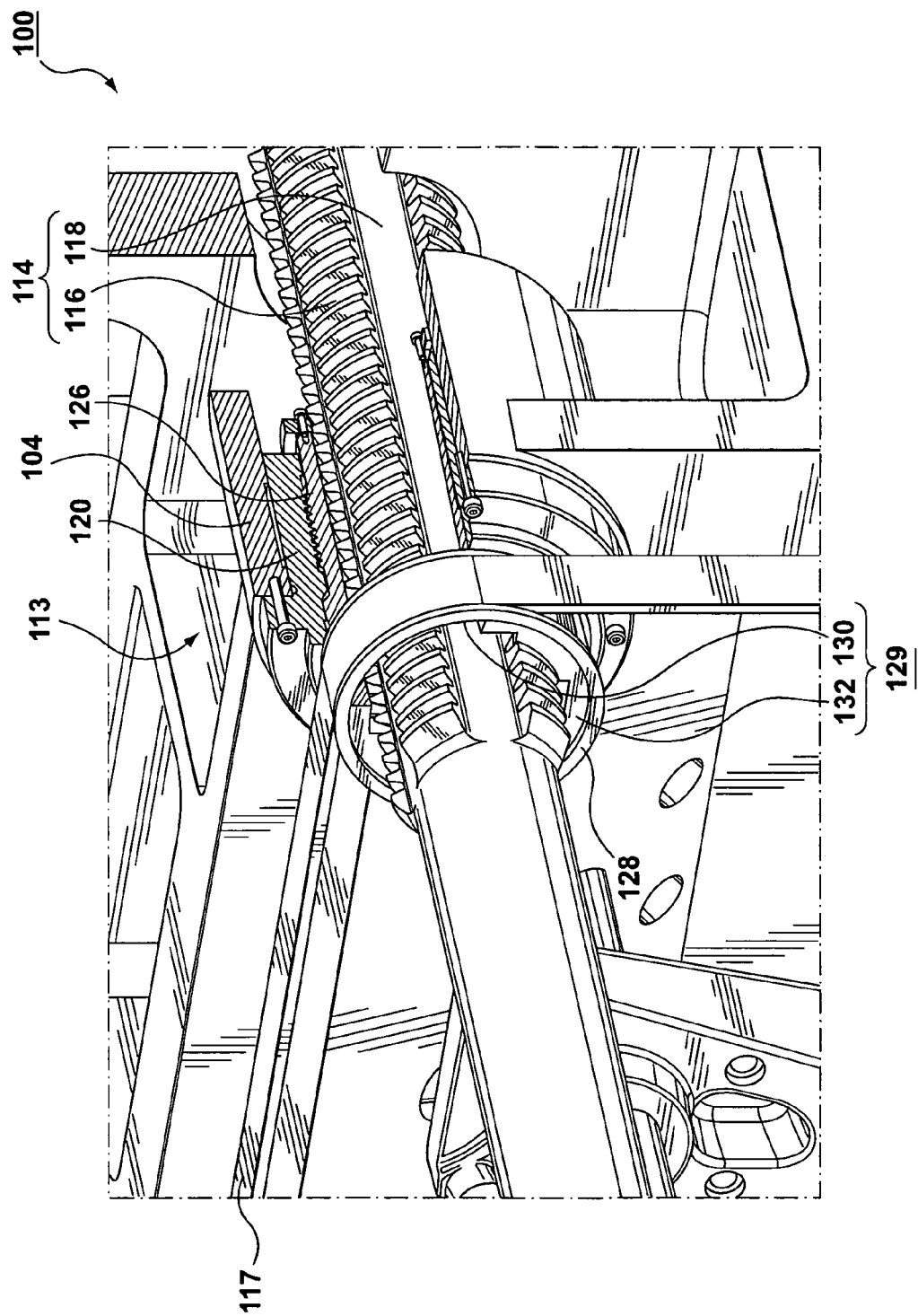
FIG. 8 is yet another perspective view of the lock of FIG. 1.

FIG. 8 is yet another perspective view of the lock 113 of the system 100 of FIG. 1, in which the lock 113 is depicted in the lockable engagement condition and the teeth 114, 229 are locked together (that is, inter-locked). Now each of the sleeves 126 is rotated such that the sleeve-interrupted teeth 129 and the bar-interrupted teeth 114 may become engaged with each other.

FIG. 9 is a cross-sectional view through the tie bar 106 of the system 100 of FIG. 8. Each of the sleeves 126 is rotated such that the sleeve-interrupted teeth 129 and the bar-interrupted teeth 114 are engaged with each other. The clamp assemblies 108 is not yet energized.

Figure 10:
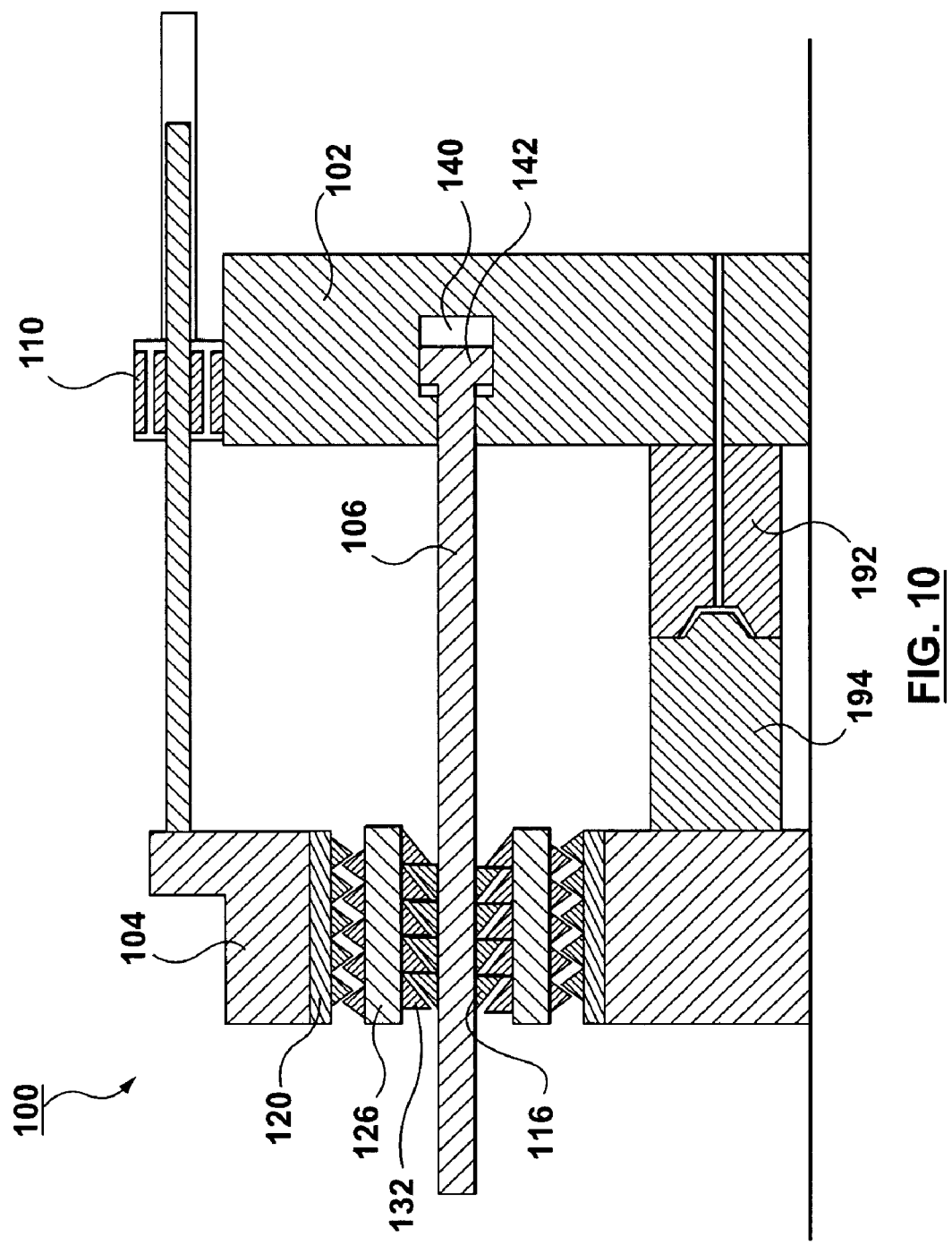

FIG. 10 is a cross-sectional view through the tie bar 106 of the system 100 of FIG. 8, in which the clamp piston 142 is moved to the right. Notice the oil chamber formed between the clamp piston 142 and the stationary platen 102 as a result of the clamp piston 142 being moved. Now a clamp force is generated and applied to the tie bar 106 so as to transmit the clamping force to the movable platen 104 and to the stationary platen 102. Now a molding material may be injected into the mold. The clamp piston 142 is moved from its hard stop position (that is, away from abutting the platen 102).

Figure 11:
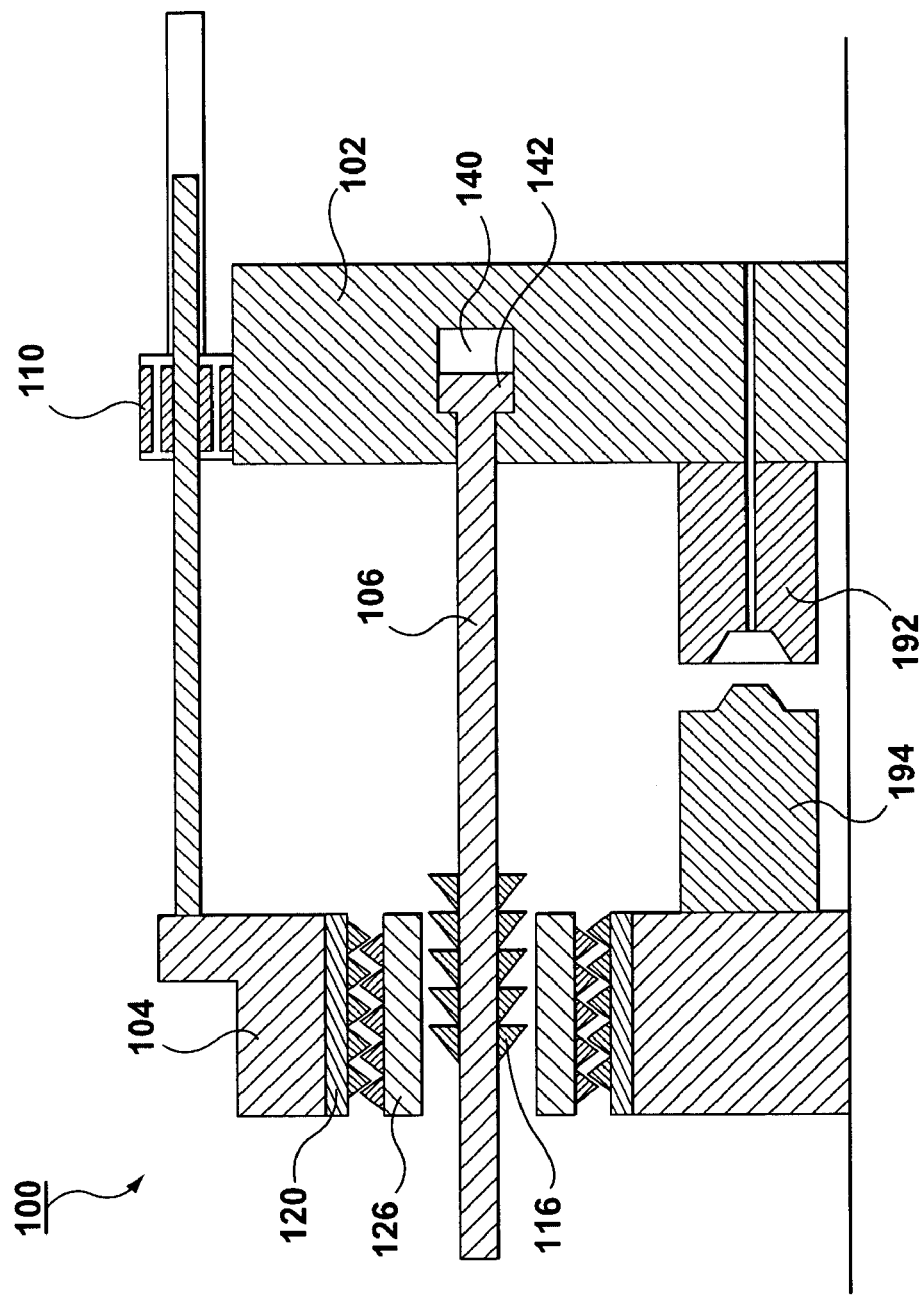

FIG. 11 is a cross-sectional view through the tie bar 106 of the system 100 of FIG. 8, in which the clamp piston 142 is decompressed, and then a mold-break force is applied by the stroke actuator 110 so as to open the mold; then the clamp piston 142 is moved fully to the left. By using the stroke actuator 110, cycle time may be reduced. It will be appreciated that the mold-break force may be applied by another device, such as the clamp piston 142 for example.

A reset piston or actuator 197 (see FIG. 1) is used to move the clamp piston 142 fully to the left so that the clamp piston 142 abuts the stationary platen 102. This condition results in a clearance between the tie-bar teeth 116 and the sleeve slot 132. At the bottom right-hand corner of FIG. 1, there is shown a cross-sectional view of the clamp assemblies 108, in which the actuator 197 is depicted to the right side of the clamp piston 142, and the actuator 197 is used to stroke the clamp piston 142 to the left. The clamp piston 142 is now located back into its hard stop position (that is, the clamp piston 142 is made to abut the stationary platen 102).

Then the sleeve 126 is rotated such that the sleeve-interrupted teeth 129 are disengaged from the bar-interrupted teeth 114. Then the stroke actuator 110 strokes the movable platen 104 away from the stationary platen 102 so as to separate the mold sufficiently enough to remove a molded part from the mold.

Figure 12:
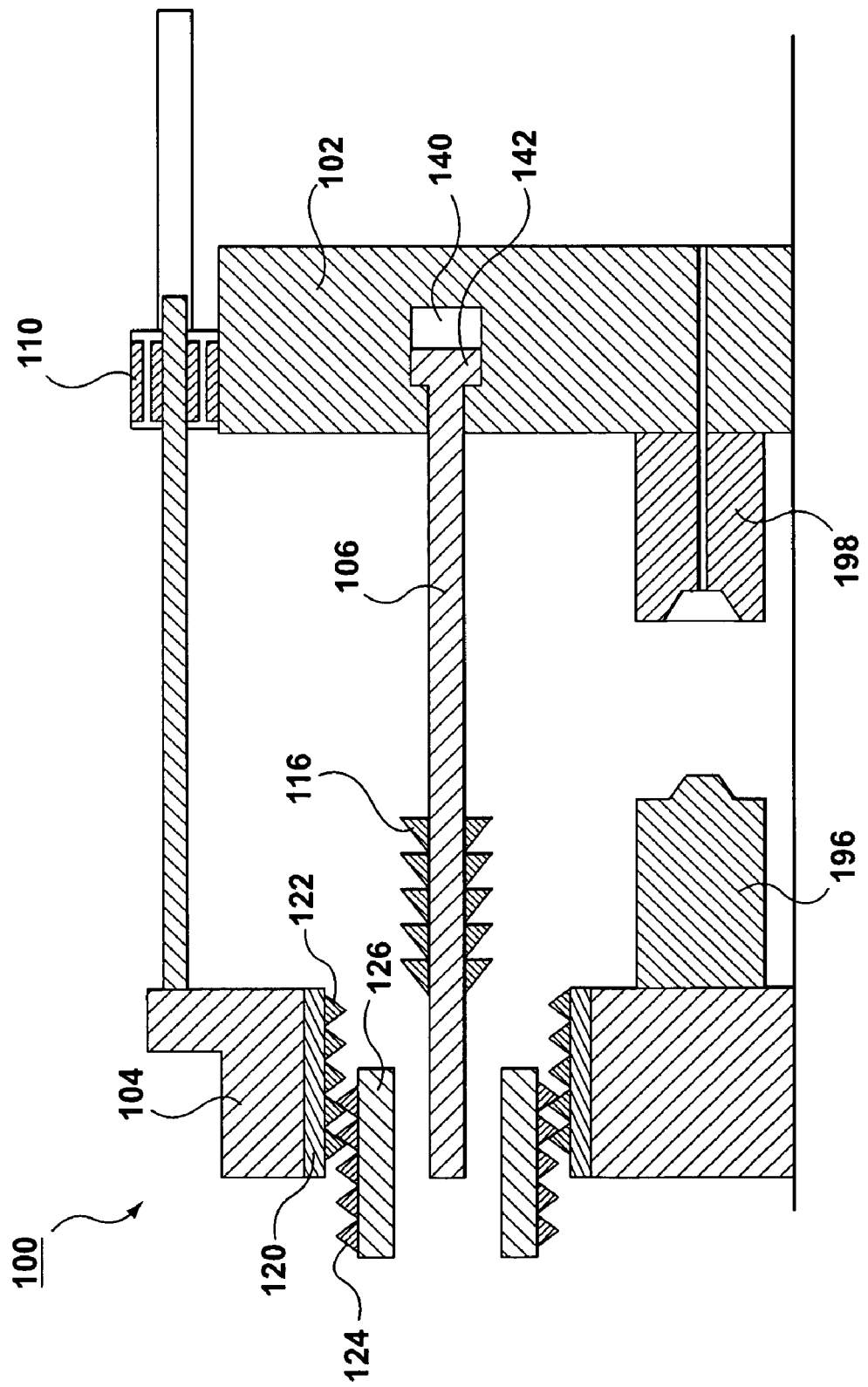
Figure 13:
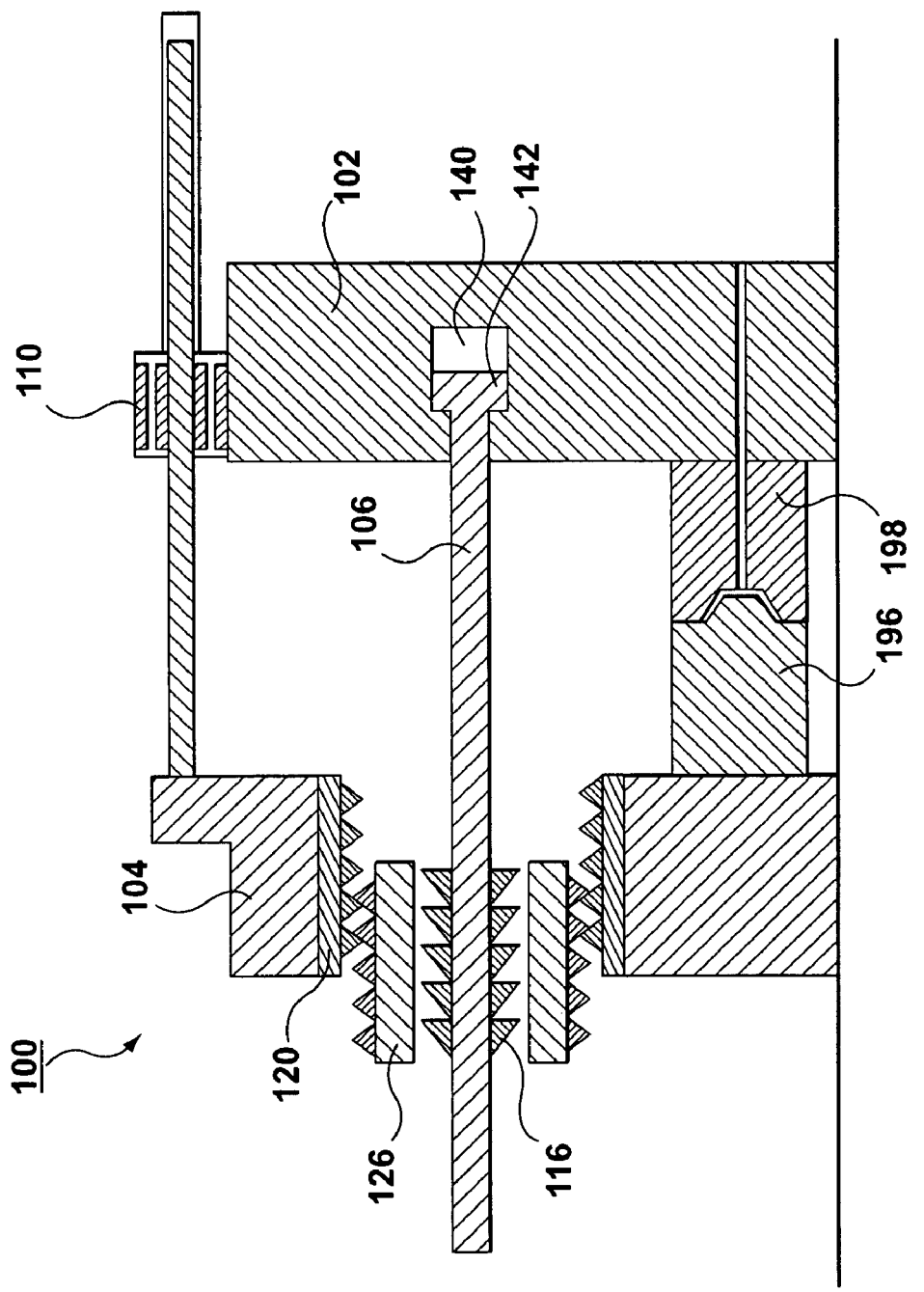

FIGS. 12 and 13 are cross-sectional views of the system 100. The mold half 194 was replaced by a mold half 196 (the mold half 196 is smaller that the mold portion-half 194). The mold portion-half 192 was replaced by a mold half 198 (the mold half 198 is smaller than the mold half 192). The sleeve-interrupted teeth 129 are displaced or cleared from the bar-interrupted teeth 114 (this is a lock-clearance condition), so that the sleeve-interrupted teeth 129 may be placable or positioned in a lock-registration position relative to bar-interrupted teeth 114, and placement of the sleeve-interrupted teeth 129 the lock-registration position takes into account mold replacement (that is, so that mold-shut height may be accommodated when the mold is closed).

The sleeve 126 was rotated by the belt 117 so that the sleeve 126 operatively accommodates mold shut-height adjustment of the platen 104 (once the platens 102, 104 are stroked closed). FIG. 13 depicts that after the movable platen 104 is stroked to close the mold half 196 and the mold half 198, the sleeve 126 is ready to become lockably engaged with the tie bar 106.

Figure 14:
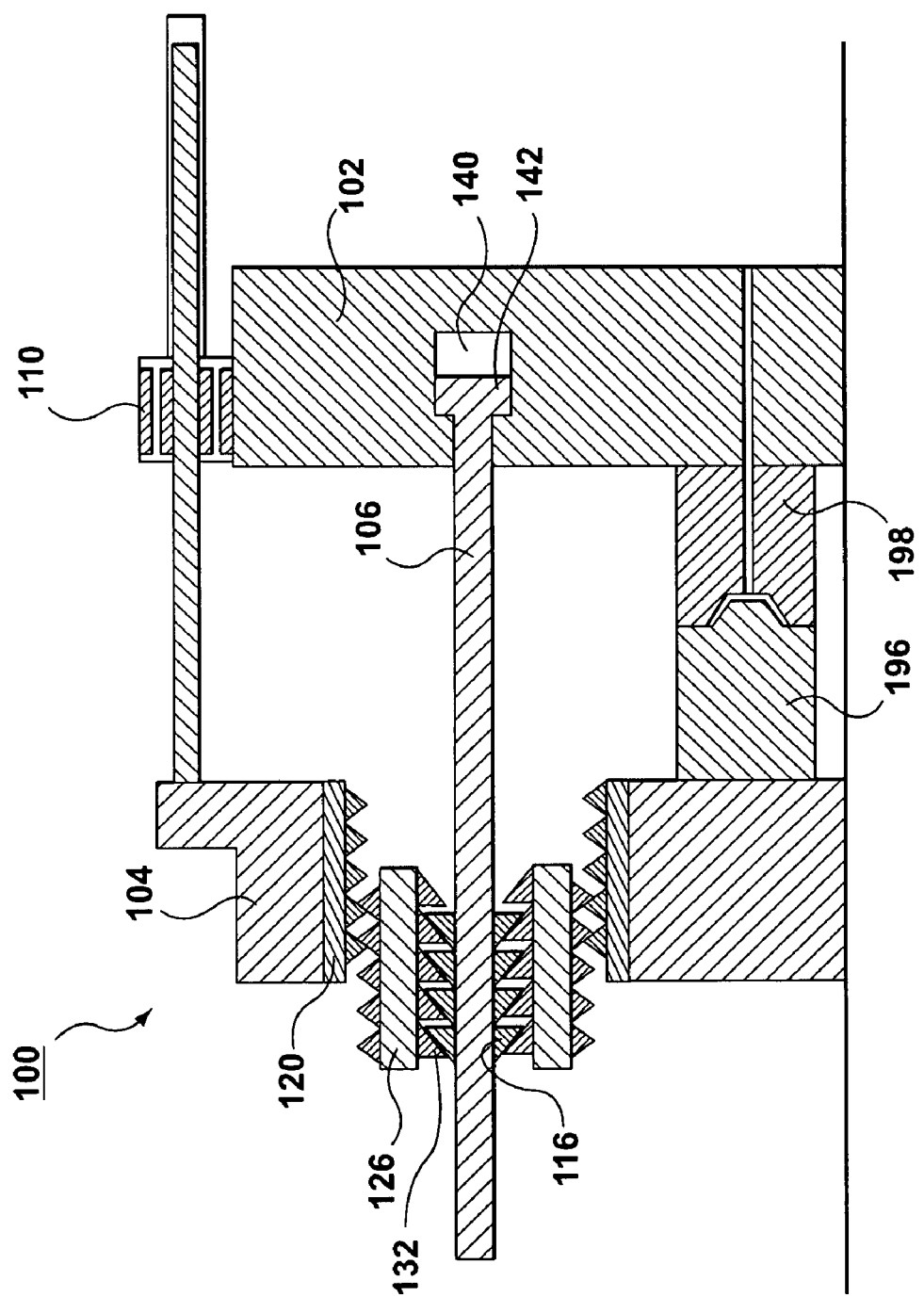
Figure 15:
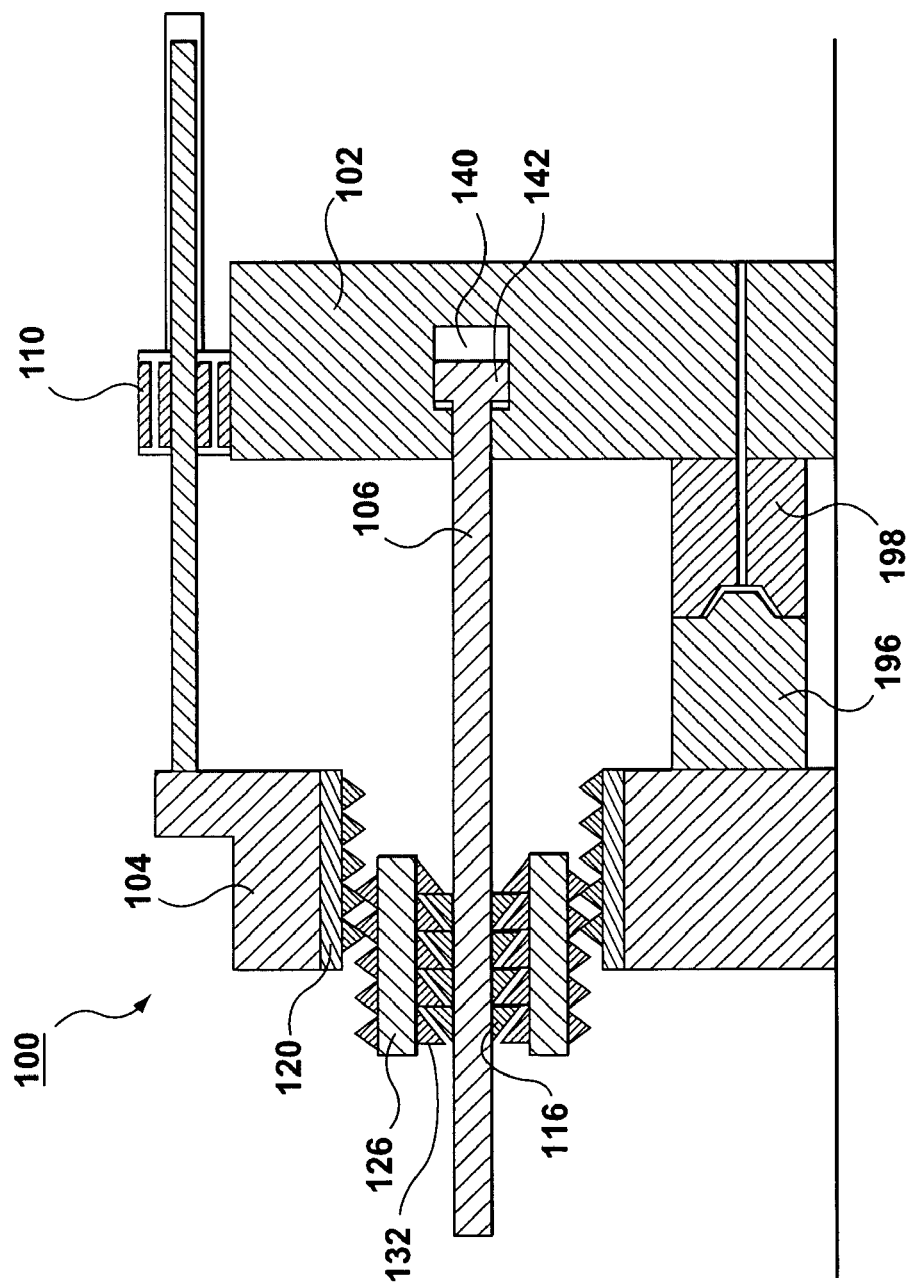

FIGS. 14 and 15 are cross-sectional views of the system 100, in which the teeth 114, 129 have become interlocked so that a clamping force may be applied by the clamp piston 142 to clamp the mold half 196 and the mold half 198 shut.

Figure 16:
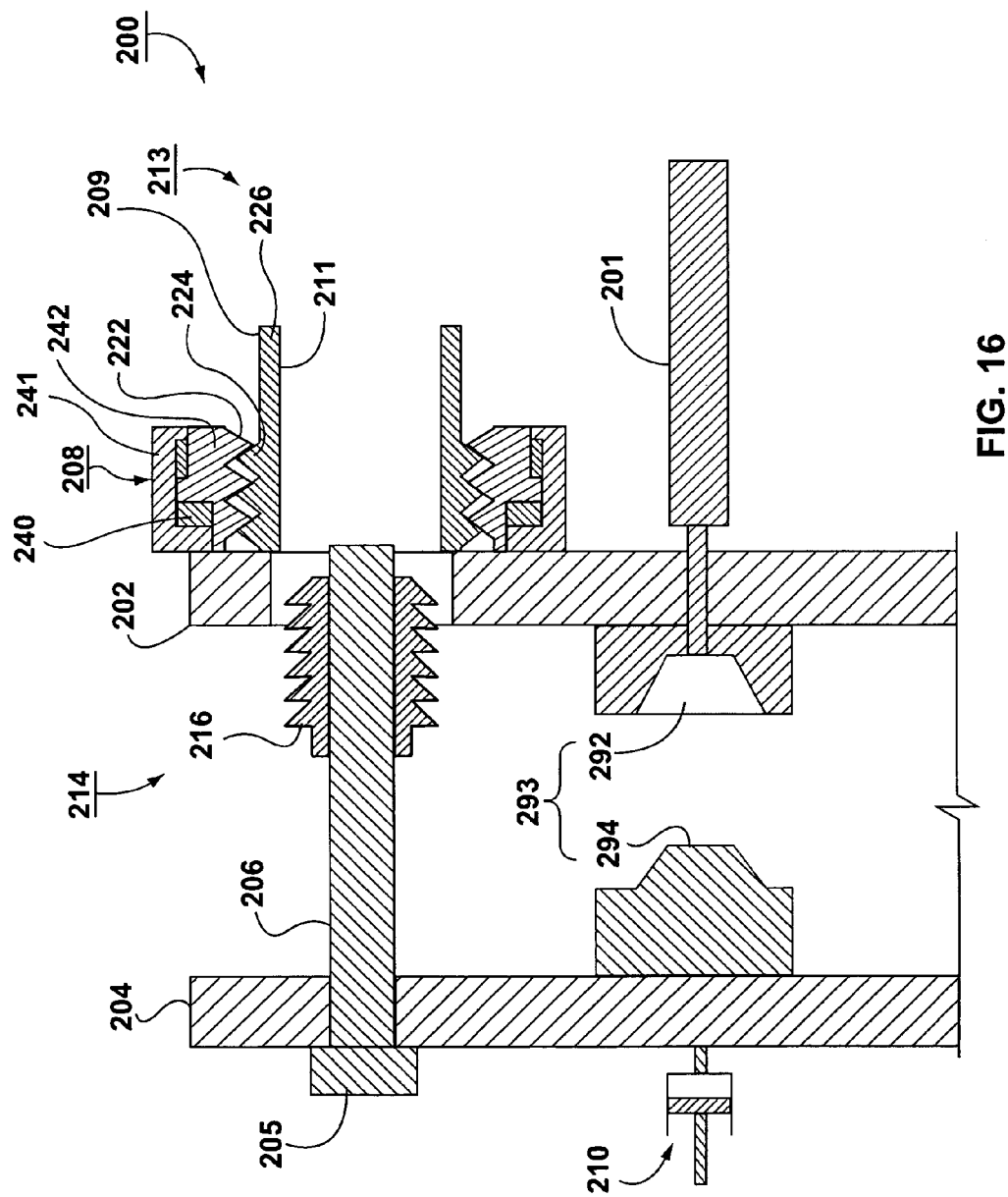
FIGS. 16 and 17 are cross-sectional views of a molding system having a molding-system lock according to a second exemplary embodiment.
Figure 17:
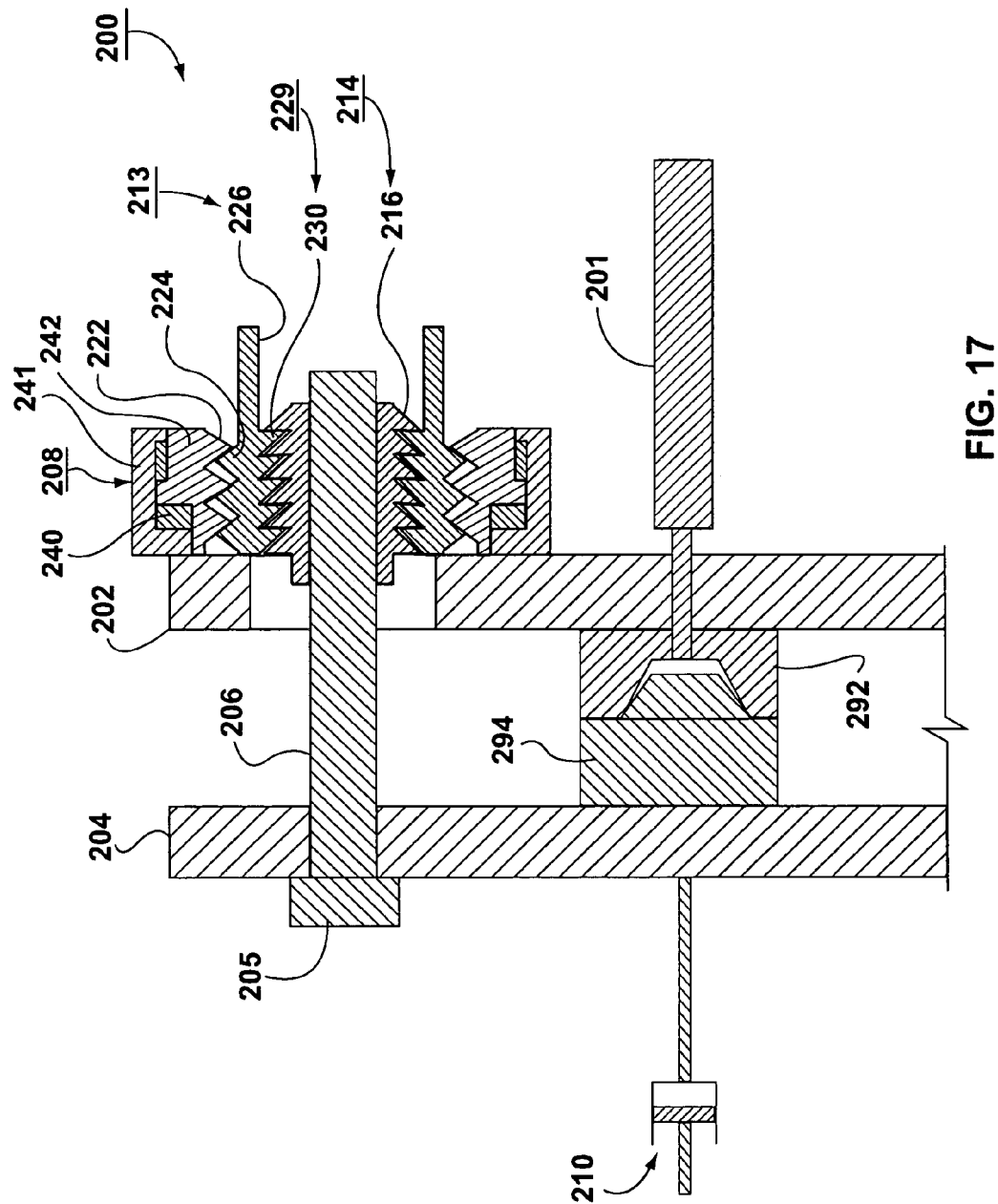

FIGS. 16 and 17 are a cross-sectional views of a molding system 200 (hereafter referred to as "the system 200") having a molding-system lock 213 (hereafter referred to as "the lock 213") according to the second exemplary embodiment. These views are taken from above the system 200. The system 200 includes an injection unit 201 that is interactable with a mold 293. To facilitate an understanding of the second exemplary embodiment, elements of the second exemplary embodiment (that are similar to those of the first exemplary embodiment) are identified by reference numerals that use a two-hundred designation rather than a one-hundred designation (as used in the first exemplary embodiment). For example, the lock of the second exemplary embodiment is labeled 213 rather than being labeled 113. Only one tie bar 206 (generally, the tie bar 206 is also called the "platen bar") is depicted for improving the description of the second exemplary embodiment.

According to the second exemplary embodiment, the tie bar 206 is fixedly attached to a movable platen 204 (by way of a nut 205). The stroke actuator 210 is used to stroke the movable platen 204 relative to a fixed platen 202 so as to close the mold 293, which includes a mold half 294 attached to the movable platen 204, and also includes a mold half 292 attached to the stationary platen 202. The tie bar 206 includes tie-bar interrupted teeth 214 at the end of the tie bar 206 located proximate to the stationary platen 202. The tie-bar interrupted teeth 214 include rows of teeth 216 and slots (which are not depicted) that are aligned along the rows of teeth 216.

The lock 213 includes a sleeve 226. A clamp assembly 208 is fixedly attached to the stationary platen 202 so as to be interactable with the tie bar 206. A clamp piston 242 is housed in a housing 241. Within the housing 241 is a clamp cylinder 240 that is interactable with the clamp piston 242. The clamp piston 242 is threadably engagable with the sleeve 226; specifically, the clamp piston 242 includes clamp-piston threads 222 (hereafter referred to as the "threads 222") that are interactable with sleeve threads 224. The sleeve 226 is interactable with a belt drive (not depicted) in the same way as that of the sleeve 126 of the first exemplary embodiment. The system 200 is shown in a mold open condition, and the interrupted teeth of the sleeve 226 are rotated so as to not interfere with the tie-bar interrupted teeth 214 of the tie bar 206. The sleeve 228 has an outer surface 209 that threadably engages the clamp piston 242. The sleeve 228 includes an inner surface 211. The sleeve threads 224 extend from the outer surface 209 and so that the sleeve threads 224 may cooperate with the threads 222 that extend from the clamp piston 242.

FIG. 17 shows the stroke actuator 210 has stroked the movable platen 204 toward the stationary platen 202 so also to close the mold halves 292, 294 together. The sleeve 226 has been rotated by use of the belt drive so that the sleeve interrupted teeth 229 are now engaged with the tie-bar interrupted teeth 214. The clamp assembly 208 may now be actuated hydraulically so as to apply a clamping force to the mold 293; after a molded article has been molded, the clamp assembly 208 may then be energized to apply a mold-break force to separate the mold halves 292, 294 apart from each other so that then the stroke actuator 210 may then move the movable platen 204 away from the stationary platen 202 so that the molded part may be removed from the mold 293.

It will be appreciated that the sleeve 226 is rotatable so that the sleeve 226 operatively accommodates mold shut-height adjustment of the platen 204 (once the platens 202, 204 are stroked closed). After the movable platen 204 is stroked closed, the sleeve 226 may be lockably engagable with the tie bar 206.

Figure 18:
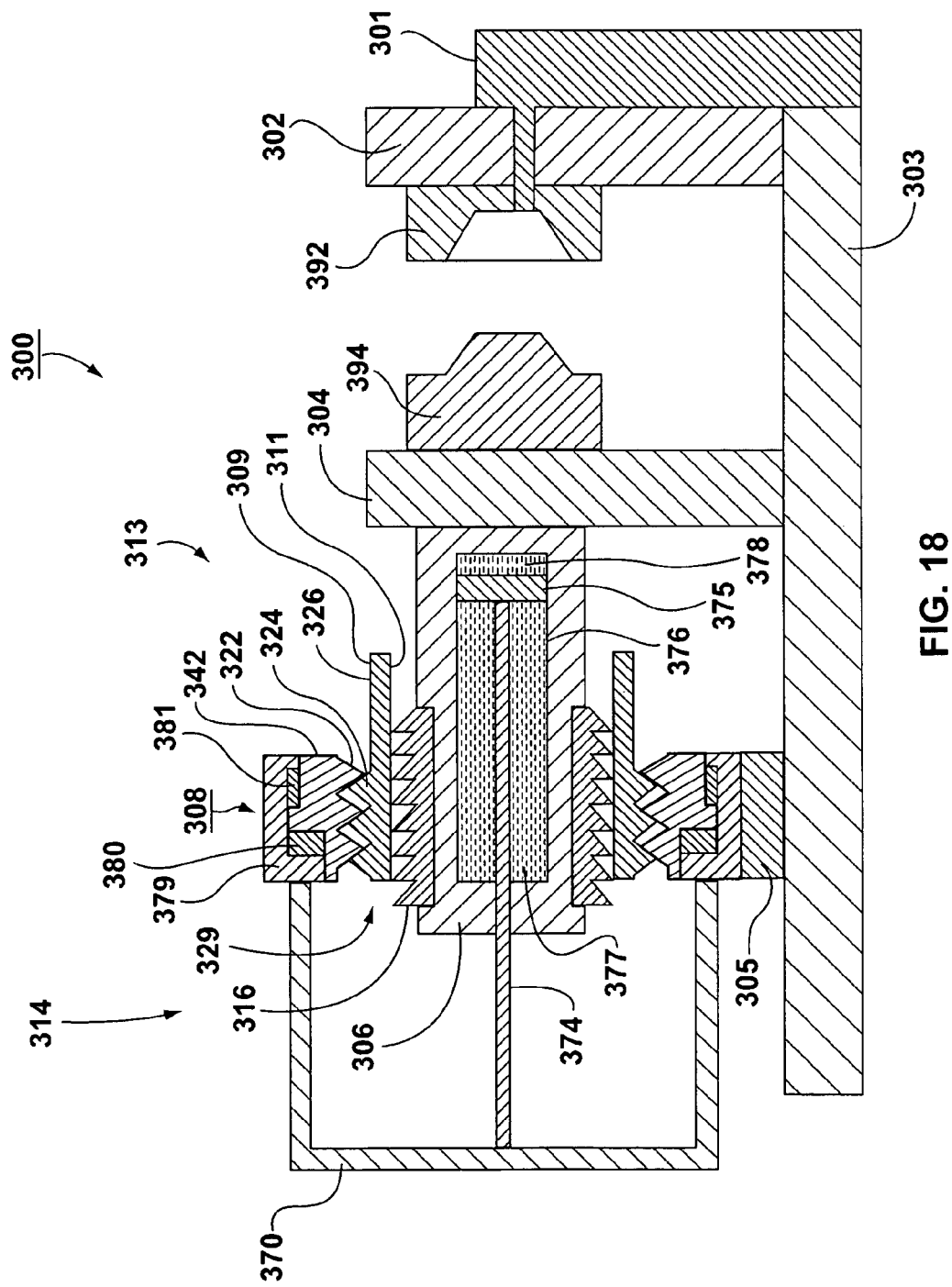
FIG. 18 is a cross-sectional view of a molding system having a molding-system lock according to a third exemplary embodiment.

FIG. 18 is a cross-sectional view along a longitudinal axis of a molding system 300 (hereafter referred to as "the system 300") having a molding-system lock 313 (hereafter referred to as "the lock 313") according to the third exemplary embodiment. The system 300 includes an injection unit 301 that is interactable with mold halves 392, 394. To facilitate an understanding of the third exemplary embodiment, elements of the third exemplary embodiment (that are similar to those of the first exemplary embodiment) are identified by reference numerals that use a three-hundred designation rather than a one-hundred designation (as used in the first exemplary embodiment). For example, the lock of the third exemplary embodiment is labeled 313 rather than being labeled 113.

The molding system 300 includes a base 303. A stationary platen 302 is fixedly attached to the base 303. A movable platen 304 is transversally slidable along the base 303. A stationary mold half 392 is fixedly attached to the stationary platen 302. A movable mold half 394 is fixedly attached to the movable platen 304. The mold halves 392, 394 cooperatively define a mold cavity therebetween for molding an article therein.

A clamp assembly 308 is depicted in a mold-opened position is mounted to a clamp platen 305 (sometimes called a clamp block). Generally, a clamp column 306 (which is also called the 'platen bar 308') extends from the clamp platen 305. An actuator 370 is actuatable to translate or stroke the movable platen 304 toward and away from the stationary platen 302 (so as to open and close the mold halves 392, 394 relative to each other).

The actuator 370 includes the clamp column 306 which is attached to the movable platen 304. Once the mold halves 392, 394 are closed against each other, the clamp assembly 308 is actuated to apply a clamping force to the mold halves 392, 394 while an injection unit 301 injects a molding material into the mold cavity (defined by the mold halves 392, 394). The clamping force keeps the mold halves 392, 394 together while the molding material enters the mold cavity under pressure. Once the molding material has solidified in the mold cavity, the clamp assembly 308 removes the clamping force and then it actuates to apply a mold-break force that is used to separate the mold halves 392, 394 apart from each other so that the molded article may then be removed from the mold halves 392, 394. Then once the mold halves 392, 394 are broken apart, the actuator 370 actuates to move (or stroke) the platens 302, 304 apart from each other.

The clamp assembly 308 includes a clamp piston 342. Tie-bar teeth 316 (which are interrupted) extend from the clamp column 306. Bar-interrupted teeth 314 (hereafter referred to as the "teeth 314") include: (i) at least one or more rows of the tie-bar teeth 316 extending from the clamp column 306, and (ii) at least one or more tie-bar slots 318 (not depicted) defined through the teeth 116 extending longitudinally along the clamp column 306. The sleeve 326 includes sleeve-interrupted teeth 329 (hereafter referred to as the teeth 329, and the teeth 329 are not depicted in FIG. 18 because they are positioned to be unlocked from the teeth 314 in this view). The teeth 314, 329 are lockable relative to each other between an unlocked position and a locked position. The actuator 370 (which is sometimes referred to as a "stroke cylinder") is used to: (i) actuatably move the clamp column 306 which then, in turn, moves the movable platen 304 to open (or separate) the mold halves 392, 394, or (ii) actuatably close the mold halves 392, 394 relative to each other. The actuator 370 includes a rod 374 and a cylinder head 375 disposed within a chamber 376 defined by the clamp column 306. Defined by the chamber 376 end the cylinder head 375 are a mold-opened hydraulic column 377 and a mold-closed hydraulic column 378. The actuator 370 is actuated to close the mold halves 392, 394. Preferably, the actuator 370 is slowed down just before the mold halves 392, 394 make contact with each other to ensure that the mold halves 392, 394 do not collide (this is sometimes referred to as a mold-protect phase). A housing 379 houses the clamp piston 342, and the clamp piston 342 moves relative to the housing 379. Sometimes the housing 379 is attached to the clamp platen 305. One way to accommodate molds of varying sizes and/or shapes is to have the clamp platen 305 translate along the base 303 and then locking the clamp platen 305 into a fixed position to the base 303. A clamping-hydraulic column 380 and a mold-break hydraulic column 381 are defined between the clamp piston 342 and the housing 379.

The lock 313 includes a sleeve 326 that has an outer surface 309 that threadably engages teeth 322 of the clamp piston 324. The sleeve 326 includes an inner surface 311, and the teeth 329 extend from the inner surface 311 and so that the teeth 329 may cooperate with the teeth 314. It is understood that FIG. 18 shows the clamp assembly 308 in an un-actuated condition (that is, the clamp assembly 308 is not yet actuated to apply a force, either clamping force or mold-break force, that is transferable over to the mold halves 392, 394).

The description of the exemplary embodiments provides examples of the present invention, and these examples do not limit the scope of the present invention. It is understood that the scope of the present invention is limited by the claims. The concepts described above may be adapted for specific conditions and/or functions, and may be further extended to a variety of other applications that are within the scope of the present invention. Having thus described the exemplary embodiments, it will be apparent that modifications and enhancements are possible without departing from the concepts as described. Therefore, what is to be protected by way of letters patent are limited only by the scope of the following claims:

What is claimed is:

1. A molding system for manufacturing molded articles, the molding system comprising:

a stationary platen being adapted to mount a stationary mold portion;

a movable platen being movable relative to the stationary platen, the movable platen being adapted to mount a movable mold portion;

an injection unit being operatively coupled with the stationary mold portion;

clamping mechanisms being mounted to corners of the stationary platen;

molding-system locks being mounted to corners of the movable platen;

a lock-drive assembly being coupled with the molding-system locks, the lock-drive assembly for synchronously locking and unlocking the molding system locks;

tie bars extending from respective clamping mechanisms to respective molding-system locks, each of the tie bars being received in a respective molding-system lock, each of the molding-system rocks selectively lockably engaging and lockably disengaging the tie bars with the movable platen, the clamping mechanisms for applying a clamping force to the tie bars and the clamping force may be transferred to the stationary platen and the movable platen so as to hold the movable mold portion closed against the stationary mold portion during injection of a molding material from the injection unit to a mold cavity, the mold cavity being defined by the stationary mold portion and the movable mold portion being held closed against each other, each of the tie bars including a distal end having bar-interrupted teeth extending over a length of the tie bars, and the bar-interrupted teeth include: (i) tie-bar teeth extending from the tie bars, and (ii) tie-bar slots defined through the tie-bar teeth extending longitudinally along the tie bars;

each of the clamping mechanisms including: (i) a clamp cylinder being formed in the stationary platen, and (ii) a clamp piston being positioned in the clamp cylinder, the clamp piston being connected to a corresponding tie bar, the clamp piston being placable in a hard stop position, the tie bars and respective clamp pistons being movable axially toward the stationary platen when each clamp cylinder becomes actuated, the tie bars and each clamp piston being movable toward the movable platen;

an actuator being coupled with the clamp piston, the actuator for pushing the clamp piston back into the hard stop position;

a stroke actuator being coupled with the movable platen, the stroke actuator for moving, after the clamping mechanisms are de-actuated so as to remove the clamping force, the movable platen away from the stationary platen so that the stationary mold portion and the movable mold portion may be separated from one another so as to allow extraction of a molded article; and a mold-break actuator being operatively coupled with the stationary mold portion and the movable mold portion, the mold-break actuator for applying a mold-break force to the stationary mold portion and the movable mold portion;

each of the molding-system locks including a rotatable sleeve, the rotatable sleeve accommodating locking and unlocking of the tie bars relative to the movable platen, and the rotatable sleeve permits mold shut-height adjustment of the tie bars, each rotatable sleeve being coupled with the lockdrive assembly; and fixed sleeves being rigidly attachable to the corners of the movable platen so that the clamping force may be transmitted to the movable platen via the tie bars, each of rotatable sleeves being rotatably engagable with a respective fixed sleeve, each of the fixed sleeves includes fixed-sleeve threads extending toward the rotatable sleeve, the fixed sleeves allowing the rotatable sleeve to be threadably movable relative to the movable platen so that the rotatable sleeve may accommodate mold shut-height adjustment of the tie bars and the movable platen, the rotatable sleeve includes externally-extending sleeve threads that are engagable with the fixed-sleeve threads, the rotatable sleeve includes a tie-bar facing surface, and the tie-bar facing surface of the rotatable sleeve includes sleeve interrupted teeth that are interlockable with the bar-interrupted teeth of the tie bars, the sleeve-interrupted teeth include sleeve-teeth and sleeve slot extending through the sleeve-teeth which are selectively engagable and disengagable with respective tie-bar slots and the tie-bar teeth, a sufficient length of the externally-extending sleeve threads and of the fixed-sleeve threads being provided such that the rotatable sleeve is rotationally positionable over a length that is greater than a pitch of the sleeve-interrupted teeth of the rotatable sleeve, a sufficient axial-tooth clearance being provided in the sleeve-interrupted teeth and the bar-interrupted teeth, such that when: (i) the rotatable sleeve is rotated between a locked position and an unlocked position; and (ii) the tie bars are in a correct position relative to the rotatable sleeve, a small amount of axial movement between the externally-extending sleeve threads and the fixed-sleeve threads does not result in contact between the rotatable sleeve and the tie bars, whereby the molding-system locks allow stroking of each clamp piston to be reduced to a minimum so that stroking of each clamp piston may be performed for only what is required for tooth clearance and for straining molding-system components under a clamp-up condition, and cycle time may be improved because active re-positioning of each clamp piston is not required for locking or unlocking of the tie bars.

2. The molding system of claim 1, wherein:

when the molding-system locks are in an unlocked condition, the rotatable sleeve is in a position so that the sleeve-interrupted teeth are clear of the bar-interrupted teeth so as to allow the rotatable sleeve to freely rotate without risk of the bar-interrupted teeth and the sleeve-interrupted teeth of making contact, and this is a sleeve-adjustment position or a lock-clearance position in which a set of sleeve-teeth and a set of sleeve slot are selectively engagable and disengagable with the respective tie-bar slots and the tie-bar teeth.

3. The molding system of claim 1, wherein:
when the molding-system locks are placed in an unlocked condition, the sleeve-teeth are aligned with the tie-bar slots, and the sleeve slot is aligned with the tie-bar teeth.

4. The molding system of claim 1. wherein:
each rotatable sleeve being rotatable into another position such that the sleeve-teeth may become lockably aligned, in a lock-registration position, with the tie-bar slots after the movable platen is stroked to close the stationary mold portion against the movable mold portion.

5. The molding system of claim 1, wherein:
after the movable mold portion is closed against the stationary mold portion and since the bar-interrupted teeth and the sleeve-interrupted teeth are in lockable registration, the rotatable sleeve may be further rotated sufficiently enough so that the sleeve-interrupted teeth and the bar-interrupted teeth may become locked together.

6. The molding system of claim 1, wherein:
once the bar-interrupted teeth and the sleeve-interrupted teeth are placed in a lock clearance position so that the movable platen and the rotatable sleeve may then be stroked so as to then close the movable mold portion against the stationary mold portion.

7. The molding system of claim 1, wherein:
the sleeve-interrupted teeth are displaced or cleared from the bar-interrupted teeth, and this is a lock-clearance condition (that is, the bar-interrupted teeth and the sleeve-interrupted teeth are rotated to clear from each other and then they are longitudinally spaced apart or longitudinally offset from each other so as to permit the rotatable sleeve to be rotated.

8. The molding system of claim 1, wherein:
in a lock-clearance condition, the sleeve-interrupted teeth and the bar-interrupted teeth do not become inter-locked if the rotatable sleeve is rotated.

9. The molding system of claim 1, wherein:
once the sleeve-interrupted teeth are displaced from the bar-interrupted teeth, the rotatable sleeve may be rotated in a lockable-registration position relative to the bar-interrupted teeth.

10. The molding system of claim 1, wherein:
in a lockable registration of the bar-interrupted teeth and the sleeve-interrupted teeth, the rotatable sleeve is rotated so that the bar-interrupted teeth and the sleeve-interrupted teeth are lockable with each other after the sleeve-interrupted teeth of the rotatable sleeve are moved to overlap the bar-interrupted teeth.

11. The molding system of claim 1, wherein:
placement of the sleeve-interrupted teeth in a lockable-registration position takes into account mold replacement so that mold-shut height may be accommodated when the movable mold portion is closed against the stationary mold portion.

12. The molding system of claim 1, wherein:
to reach a lock-clearance condition, the sleeve-interrupted teeth were previously moved away from a lockable-engagement condition with the bar-interrupted teeth to the lock-clearance condition.

13. The molding system of claim 1, wherein:
after placement of the sleeve-interrupted teeth which takes into account mold replacement, the sleeve-interrupted teeth will be moved from a lock-clearance condition to a lockable-engagement condition with the bar-interrupted teeth so that upon mold closure, the sleeve-interrupted teeth and the bar-interrupted teeth are advantageously registered to be interlockable with each other.

14. The molding system of claim 1, wherein:
when the molding-system locks are in an unlocked condition, the rotatable sleeve is in a position so that the sleeve-interrupted teeth are clear of the bar-interrupted teeth so as to allow the rotatable sleeve to freely rotate without risk of the bar-interrupted teeth and the sleeve-interrupted teeth of making contact, and this is a sleeve-adjustment position or a lock-clearance position in which a set of sleeve-teeth and a set of sleeve slot are selectively engagable and disengagable with the respective tie-bar slots and the tie-bar teeth;

when the molding-system locks are placed in the unlocked condition, the sleeve-teeth are aligned with the tie-bar slots, and the sleeve slot is aligned with the tie-bar teeth;

after the movable mold portion is closed against the stationary mold portion and since the bar-interrupted teeth and the sleeve-interrupted teeth are in lockable registration, the rotatable sleeve may be further rotated sufficiently enough so that the sleeve-interrupted teeth and the bar-interrupted teeth may become locked together;

once the bar-interrupted teeth and the sleeve-interrupted teeth are placed in a lock clearance position so that the movable platen and the rotatable sleeve may then be stroked so as to then close the movable mold portion against the stationary mold portion;

in a lock-clearance condition, the sleeve-interrupted teeth and the bar-interrupted teeth do not become inter-locked if the rotatable sleeve is rotated;

once the sleeve-interrupted teeth are displaced from the bar-interrupted teeth, the rotatable sleeve may be rotated in a lockable-registration position relative to the bar-interrupted teeth;

in the lockable registration of the bar-interrupted teeth and the sleeve-interrupted teeth, the rotatable sleeve is rotated so that the bar-interrupted teeth and the sleeve-interrupted teeth are lockable with each other after the sleeve-interrupted teeth of the rotatable sleeve are moved to overlap the bar-interrupted teeth;

placement of the sleeve-interrupted teeth in the lockable-registration position takes into account mold replacement so that mold-shut height may be accommodated when the movable mold portion is closed against the stationary mold portion;

to reach the lock-clearance condition, the sleeve-interrupted teeth were previously moved away from a lockable-engagement condition with the bar-interrupted teeth to the lock-clearance condition; and after placement of the sleeve-interrupted teeth which takes into account the mold replacement, the sleeve-interrupted teeth will be moved from the lock-clearance condition to the lockable-engagement condition with the bar-interrupted teeth so that upon mold closure, the sleeve-interrupted teeth and the bar-interrupted teeth are advantageously registered to be interlockable with each other.

* * * * *